United States Patent
Sakamoto et al.

(10) Patent No.: US 9,541,813 B2
(45) Date of Patent: Jan. 10, 2017

(54) IMAGE DISPLAY DEVICE WITH MEMORY

(75) Inventors: Michiaki Sakamoto, Kanagawa (JP); Koji Shigemura, Kanagawa (JP)

(73) Assignee: NLT TECHNOLOGIES, LTD., Kanagawa (JP)

( * ) Notice: Subject to any disclaimer, the term of this patent is extended or adjusted under 35 U.S.C. 154(b) by 17 days.

(21) Appl. No.: 14/375,661

(22) PCT Filed: Jan. 30, 2012

(86) PCT No.: PCT/JP2012/052000
§ 371 (c)(1),
(2), (4) Date: Jul. 30, 2014

(87) PCT Pub. No.: WO2013/114536
PCT Pub. Date: Aug. 8, 2013

(65) Prior Publication Data
US 2014/0354615 A1  Dec. 4, 2014

(51) Int. Cl.
*G02F 1/167* (2006.01)
*G09G 3/34* (2006.01)
(Continued)

(52) U.S. Cl.
CPC ........... *G02F 1/167* (2013.01); *G02F 1/13306* (2013.01); *G09G 3/2003* (2013.01); *G09G 3/344* (2013.01);
(Continued)

(58) Field of Classification Search
CPC ............................. G09G 3/344; G09G 3/3446
See application file for complete search history.

(56) References Cited

U.S. PATENT DOCUMENTS 7,706,052 B2    4/2010  Kang et al.
7,834,843 B2   11/2010  Karaki
(Continued)

FOREIGN PATENT DOCUMENTS

CN        1734338      2/2006
CN      101276118     10/2008
(Continued)

OTHER PUBLICATIONS

International Search Report, PCT/JP2012/052000, Apr. 10, 2012.
(Continued)

*Primary Examiner* — Benjamin C Lee
*Assistant Examiner* — Dong Hui Liang
(74) *Attorney, Agent, or Firm* — Young & Thompson

(57) ABSTRACT

An image display device having improved image retention capability by analyzing the mechanism behind the creation of an unwanted electric field applied to an element after a power supply is turned off, and devising a drive method and so forth for compensating for the same, is provided. Electrophoretic particles contain three types of charged particles, C (cyan), M (magenta), and Y (yellow) that are mutually different in color and threshold voltage for starting electrophoresis. When the threshold voltages of C (cyan), M (magenta) and Y (yellow) are respectively Vth3, Vth2, and Vth3, these satisfy the relationship |Vth3|<|Vth2|<|Vth1|. Further, a voltage application unit applies a voltage (VE) different from a reference potential during the final period of image update period. The voltage (VE) is a compensation voltage that suppresses the movement of charged particles.

12 Claims, 18 Drawing Sheets

(51) Int. Cl.
*G09G 3/20* (2006.01)
*G02F 1/133* (2006.01)
*G09G 5/02* (2006.01)

(52) U.S. Cl.
CPC .............. *G09G 3/2018* (2013.01); *G09G 5/02* (2013.01); *G09G 2300/08* (2013.01); *G09G 2310/0251* (2013.01); *G09G 2310/0264* (2013.01); *G09G 2310/06* (2013.01); *G09G 2320/0204* (2013.01); *G09G 2320/0223* (2013.01); *G09G 2320/0242* (2013.01); *G09G 2330/028* (2013.01)

(56) References Cited

U.S. PATENT DOCUMENTS

| | | | |
|---|---|---|---|
| 8,154,509 B2 | 4/2012 | Karaki | |
| 2005/0001812 A1* | 1/2005 | Amundson | G02F 1/167 345/107 |
| 2005/0024353 A1* | 2/2005 | Amundson | G02F 1/167 345/204 |
| 2005/0041004 A1* | 2/2005 | Gates | G09G 3/20 345/87 |
| 2006/0029250 A1* | 2/2006 | Karaki | B41J 3/4076 382/100 |
| 2006/0279525 A1* | 12/2006 | Matsuda | G02F 1/167 345/107 |
| 2007/0268207 A1 | 11/2007 | Karaki | |
| 2008/0117165 A1* | 5/2008 | Machida | G09G 3/3446 345/107 |
| 2008/0122783 A1* | 5/2008 | Jung | G02F 1/167 345/107 |
| 2009/0046052 A1 | 2/2009 | Kim et al. | |

FOREIGN PATENT DOCUMENTS

| | | |
|---|---|---|
| CN | 101452673 | 6/2009 |
| EP | 1936598 | 6/2008 |
| JP | 2005-326883 | 11/2005 |
| JP | 2006-133332 | 5/2006 |
| JP | 2007-316594 | 12/2007 |
| JP | 4049202 | 2/2008 |
| JP | 4269605 | 5/2009 |
| JP | 4385438 | 12/2009 |
| JP | 2010-210660 | 9/2010 |
| JP | 2010-210806 | 9/2010 |
| JP | 2010-210899 | 9/2010 |
| JP | 4806634 | 11/2011 |
| JP | 4811510 | 11/2011 |

OTHER PUBLICATIONS

Extended European search report, dated Oct. 15, 2015; Application No. 12867304.3.
Chinese Office Action dated May 18, 2016 in corresponding Chinese Patent Application No. 201280068587.9 with English translation of Chinese Office Action.

* cited by examiner

IMAGE DISPLAY DEVICE WITH MEMORY

TECHNICAL FIELD

The present invention relates to an image display device with a memory. More specifically, the present invention relates to an image display device with a memory, which is preferably used for electronic paper display devices such as electronic books, electronic newspapers, and the like.

BACKGROUND ART

As a display device with which an act of "reading" can be done without feeling stress, electronic paper display devices called electronic books, electronic newspapers, and the like are being developed. This kind of electronic paper display device is required to be thin, light, hard to be smashed, and low in power consumption. Thus, it is preferable to be formed with a display element with a memory. As a display element used for a display device with a memory, an electrophoretic display element, a cholesteric liquid crystal, and the like are known. Recently, an electrophoretic display element using two or more kinds of charged particles has drawn an attention.

A monochrome display active matrix drive type electrophoretic display device will be described. This electrophoretic display device is constituted by stacking a TFT glass substrate, an electrophoretic display element film, and a counter substrate in this order. TFTs (Thin Film Transistors) that are a great number of switching elements arranged in matrix, pixel electrodes, gate lines, and data lines connected to each of the TFTs are provided on the TFT glass substrate. The electrophoretic display element film is formed by spreading microcapsules of about 40 μm all over in a polymer binder. A solvent is injected inside the microcapsules. In the solvent, two kinds of nanoparticles charged plus and minus, i.e., a white pigment such as oxide titanium particles charged minus and a black pigment such as carbon particles charged plus, are sealed in a dispersedly floated manner. Further, as the counter electrode, a counter electrode giving a reference potential is formed.

The electrophoretic display device operates by moving the white pigment and the black pigment vertically through applying a voltage corresponding to pixel data between a pixel electrode and a counter electrode. That is, when a plus voltage is applied to the pixel electrode, the white pigment charged minus is gathered to the pixel electrode while the black pigment charged plus is gathered to the counter electrode. Thus, provided that the counter electrode side is the display face, black is displayed on the screen (all the examples provided hereinafter will be described while assuming that the counter electrode side is the display face). In the meantime, when a minus voltage is applied to the pixel electrode, the black pigment charged plus is gathered to the pixel electrode while the white pigment charged minus is gathered to the counter electrode. Therefore, white is displayed on the screen.

That is, a plus signal voltage is applied to the pixel electrode when switching the image from white display to black display, a minus signal voltage is applied to the pixel electrode when switching from black display to white display, and 0 (V) is applied when maintaining the current image, i.e., when switching display from white display to white display and from black display to black display. As described, the electrophoretic display device has a memory, so that the signal to be applied is determined by comparing the current image (previous screen) with the next image (updated screen).

While the monochrome display microcapsule type electrophoretic display device has been described above, electrophoretic display devices capable of providing color display without losing a monochrome excellent display performance of the electrophoretic display device close to paper have been developed recently. These devices provide monochrome and color displays by displaying colors of uncharged particles and colors of each of charged particles by using uncharged (or weak charged) particles having no sensitivity in the electric fields and a plurality of particles of same polarity or inverse polarities having sensitivity in the electric field in a solvent (see Patent Documents 1 and 2).

For example, the color electrophoretic display device described in Patent Document 1 is constituted with: a pair of substrates; a solvent sealed in the gap between the pair of substrates; and three different colors (e.g., cyan C, magenta M, and yellow Y) of electrophoretic particles charged plus or minus as well as uncharged white particles (W) contained in the solvent. The threshold voltages of the three different colors of electrophoretic particles when starting migration are different from each other. Thus, it is possible with a single cell to display not only white (W) and black (K) but also cyan (C), magenta (M), yellow (Y) as well as secondary colors and tertiary colors of CMY through applying a voltage by using the difference in each of the threshold voltages.

A driving method for providing color display by using the difference in the threshold voltages through placing the charged particles C, M, Y and the white particles W on the same pixel electrode will be described by referring to FIG. 18. Hereinafter, the threshold voltages of the charged particles C, M, and Y are defined as $Vth(c)$, $Vth(m)$, and $Vth(y)$ and assumed to be in a relation of $|Vth(c)|<|Vth(m)|<Vth(y)$. Further, the applied voltages V1, V2, and V3 are assumed to satisfy relations of $|Vth(c)|<|V3|<|Vth(m)|$, $|Vth(m)|<|V2|<|Vth(y)|$, and $|Vth(y)|<|V1|$.

FIG. 18 is a hysteresis loop of the charged particles C, M, and Y, which shows the relation between the applied voltage (threshold voltage) and the relative color density. In this chart, for simplifying the explanation, the moving time in which the charged particles Y, M, and C migrate from the back face to the display face is set to be different time from each other so that the slopes of each hysteresis Y, nY, M, nM, C, and nC become constant. For example, when the material design of the charged particles is done in such a manner that the drive voltage at least satisfies the demand for low power consumption, the voltages are $|Vth(c)|\approx 7$ (V), $|Vth(m)|\approx 12$ (V), $|Vth(y)|\approx 28$ (V), and the drive voltages are required to be set as $|V3|=10$ (V), $|V2|=15$ (V), and $|V1|=30$ (V).

In FIG. 18, the first (previous) screen is defined as white (W). When a voltage +V3 is applied, the electrophoretic particles of cyan (C) migrate to the display face side, so that cyan is displayed. When a voltage +V2 is applied, the electrophoretic particles of cyan (C) and magenta (M) migrate to the display face side, so that blue (B) is displayed. When a voltage +V1 is applied, the electrophoretic particles of cyan (C), magenta (M), and yellow (Y) migrate to the display face side, so that black (K) is displayed. Further, when the previous screen is white (W) and a minus voltage is applied, no color particle is on the display face side so that the screen remains as white (W).

In the meantime, when the previous screen is black (K) and a voltage −V3 is applied, the electrophoretic particles of cyan (C) migrate to the back face substrate side and the electrophoretic particles of magenta (M) and yellow (Y) remain on the display face side so that red (R) is displayed. When the previous screen is black (K) and a voltage −V2 is applied, the electrophoretic particles of cyan (C) and magenta (M) migrate to the back face substrate side and the electrophoretic particles of yellow (Y) remain on the display face side so that yellow (Y) is displayed. When the previous screen is black (K) and a voltage −V1 is applied, all the electrophoretic particles of cyan (C), magenta (M), and yellow (Y) migrate to the back face substrate side so that white (W) is displayed. Further, for displaying magenta (M), a voltage +V2 is applied and the displayed color is changed once from white (W) display to blue (B). Then, a voltage −V3 is applied to move the electrophoretic particles of cyan (C) to the back face so as to display magenta (M).

This operation can be expressed as follows. Assuming that the color density of the charged particles C in each pixel constituting a next screen to be updated is Rc, the color density of the charged particles M is Rm, and the color density of the charged particles Y is Ry, applied is a drive waveform that is constituted with:

a reset period where a reset voltage is applied to reset to a white or black base state;

a first voltage applying period where a first voltage V1 (or −V1) or/and 0 (V) voltage is applied to transit the base state into a first intermediate transition state where the color density of the charged particles C, M, and Y become Ry;

a second voltage applying period where a second voltage V2 (or −V2) or/and 0 (V) voltage is applied to transit the first intermediate transition state into a second intermediate transition state where the color density of the charged particles C and M become Rm while maintaining the color density of the charged particles Y as Ry; and a third voltage applying period where a third voltage V3 (or −V3) or/and 0 (V) voltage is applied to transit the base state into a third intermediate transition state where the color density of the charged particles C become Rc while maintaining the color density of the charged particles M and Y as Rm and Ry.

Methods for controlling particles that are not able to migrate or particles migrate again from the fixed positions in a typical electrophoretic display device are disclosed in Patent Documents 4 and 5.

Patent Document 4 describes a method which applies a first data input pulse or a second data input pulse whose data width is narrower or data strength is smaller than that of the first data input pulse in an image rewrite period in an electrophoretic display element of two-particle type with different polarities. As described, disclosed is a technique which improves the image quality through applying a prescribed voltage to the electrophoretic particles for the time required to migrate a prescribed distance between the electrodes and then applying a pulse for a shorter time or of a lower voltage than that between the electrodes to move the particles that were not able to migrate, the particles re-migrated from the fixed positions, and the like to the fixed position again.

Further, Patent Document 5 discloses a means for improving the screen retention capability (memory) through adding additional signals whose voltage changes gradually to the base potential after applying signals for displaying images on a display unit so as to suppress migration of the charged particles in the electrophoretic display element of two-particle type with different polarities. The above is done to apply an additional correction pulse for increasing the retention capability of the screen.

Patent Document 6 mentions that re-migration of the charged particles occurred during the transition from a screen update period to a retention period is caused due to an electric field by feed-through (to be described later). All the active matrix displays are subjected to an action called feed-through with which the voltage reaching the pixel electrodes changes from a corresponding data voltage input by a certain extent (normally 0.5 to 2.0 (V)). The feed-through effect is generated from scanning of the gate lines via a coupling electric circuit net between the gate lines which scan TFT and the pixel electrodes. That is, described in Patent Document 6 is as follows. The voltage actually applied to the pixel electrodes is shifted in a minus direction from the data voltage written to the pixel electrodes for the feed-through at the time of scanning Normally, for corresponding to the feed-through, the counter electrode is offset to the minus side from the reference potential (normally, ground GND) by a specific extent. Further, when scanning is stopped, there is an offset generated between the pixel electrodes and the counter electrode for the amount of the feed-through voltage.

As a countermeasure thereof, disclosed in Patent Document 6 is not to apply an unnecessary DC offset voltage through stopping scanning by fixing the scanning lines to a gate-off voltage and instantly switching the counter electrode voltage to GND from the feed-through voltage −Vfd by an analog switch in a non-wiring mode between a writing mode and power-off (retention).

Further, as the known technique described in Patent Document 7 and also employed in Patent Documents 5, 6, generally known is a technique with which the input pulse before turning off the power terminates at 0 (V). However, migration of the charged particles occurs also when the power is turned off from a screen update period where the display device is driven and an unnecessary electric field is applied to the elements. As will be described later in details, it is not possible to deal with such case with an additional correction pulse even if a correction pulse that terminates at 0 (V) is applied. Further, a mechanism with which the charged particles migrate when the power is turned off has not been analyzed. Furthermore, a waveform to be employed when multi-particles of different threshold values of Patent Documents 1 and 2 is not specifically disclosed therein.

Patent Document 1: Japanese Patent No. 4049202
Patent Document 2: Japanese Patent No. 4385438
Patent Document 3: Japanese Patent No. 4269605
Patent Document 4: Japanese Unexamined Patent Publication 2007-316594
Patent Document 5: Japanese Patent No. 4811510
Patent Document 6: Japanese Patent No. 4806634
Patent Document 7: Japanese Unexamined Patent Publication 2005-326883
Patent Document 8: Japanese Unexamined Patent Publication 2010-210806
Patent Document 9: Japanese Unexamined Patent Publication 2010-210660

There are following issues with the related techniques described above.

With the color electrophoretic display elements depicted in Patent Documents 1 and 2, the electric field sensitivity of the charged particles (C in the above-described case) with the lowest threshold voltage is extremely high so that the migration occurs even with the extent of about Vth(C)≈1 (V). Thus, after the screen update driving period (from a reset period to a third voltage applying period) ends and a voltage is continuously applied during a period from the point where the power supply voltage that is applied for driving the panel is turned off to a retention period, the charged particles migrated to the display face or the opposite face thereof leave from the substrate after update of the screen and mixed with W particles that are uncharged particles. Thereby, the colors may become unclear and variations in the color density are generated between pixels and recognized as unevenness, which result in deteriorating the display quality. Therefore, with the color electrophoretic display devices, it is necessary to control the layout of the charged particles after the screen update period.

In other words, when the power supplied for driving the panel is turned off with this driving method in the color electrophoretic display element using the charged particles which are mutually different in colors and threshold voltage for starting electrophoresis disclosed in Patent Documents 1 and 2, a weak voltage is continuously applied to the element by a difference in the discharge speeds between the pixel electrode voltage and the counter electrode voltage (to be described later). Thus, the large charged particles with the lowest threshold voltage migrate and the particles disposed once on the display face or the opposite face thereof leave from the substrate, so that there is an issue of deterioration in the retention capability (memory) with which the display image becomes unclear.

The techniques of Patent Documents 4 and 5 apply an additional correction pulse for improving the retention capability of the screen. However, migration of the charged particles occurs also when the power is turned off from a screen update period where the display device is driven and an unnecessary electric field is applied to the elements so that it is not possible to deal with such case with the additional correction pulse. Further, a mechanism with which the charged particles migrate when the power is turned off has not been analyzed. Furthermore, a waveform to be employed when multiple particles of different threshold values of Patent Documents 1 and 2 is not specifically disclosed therein.

In other words, while Patent Documents 4 and 5 disclose a technique for improving the retention capability of the screen by applying an additional correction pulse, the correction pulse is terminated at 0 (V) in the final sub-frame so that the unnecessary electric field applied to the element after the power is turned off cannot be eliminated. Therefore, the issue cannot be overcome substantially.

With the technique of Patent Document 6, it is not possible to perfectly follow the signal source even if the counter electrode voltage is changed instantly since the counter electrode is connected to the signal source via transfer resistance or sheet resistance of ITO (Indium Tin Oxide). Further, the pixel electrode is connected to the data line not via floating but via leak resistance of TFT, so that the pixel electrode voltage does not perfectly follow the change in the counter electrode voltage. Thus, the transit voltage of the counter electrode voltage and the transit voltage of the pixel electrode at the time of switching are different, and the DC offset generated due to the voltage difference cannot be eliminated completely. In particular, cyan particles (C) whose threshold voltage is small and the charged amount is large are to re-migrate because of the DC offset.

It is therefore an object of the present invention to overcome the above-described issues and to provide an image display device whose screen retention capability is improved by analyzing the mechanism with which the unnecessary electric field applied to the element after the power is turned off is generated and by devising the driving method and the like for enabling compensation thereof.

DISCLOSURE OF THE INVENTION

The image display device with a memory according to the present invention is an image display device with a memory which includes: a first substrate in which a plurality of pixels each having a switching element and a pixel electrode are arranged in matrix; a second substrate on which a counter electrode is formed; an electrophoretic layer formed by containing electrophoretic particles, which is interposed between the first substrate and the second substrate; a display unit which includes the first substrate, the second substrate, and the electrophoretic layer; and a voltage application unit which updates a display state of the display unit to a next screen in a prescribed color density by applying a voltage to the electrophoretic particles via the pixel electrode and the counter electrode in a screen update period, wherein the electrophoretic particles contain n kinds (n is an integer of 2 or larger) of charged particles C1 to Cn which are mutually different in colors and threshold voltage for starting electrophoresis; provided that m is an all the integers from 2 to n, threshold voltage $|Vth(Cm)|$ of the charged particles Cm satisfies a relation of $|Vth(Cm)|<|Vth(C(m-1))|$; and the voltage application unit applies a compensation voltage for suppressing movement of the charged particles Cn in a final period of the screen update period.

The present invention makes it possible to improve the retention capability (memory) of the screen through suppressing the movement of the charged particles Cn having the largest charge amount (small threshold voltage) after the power is turned off by compensating the potential difference between the pixel electrode and the counter electrode generated at the time of turning off the power for display in the image display device that uses the charged particles which are mutually different in colors and threshold voltage for starting electrophoresis.

BRIEF DESCRIPTION OF THE DRAWINGS

FIGS. 6A-6C show charts for describing the influence of time product of the potential difference between the pixel electrode and the counter electrode imposed upon the charged particles of the maximum charged amount according to the first embodiment, in which FIG. 6A is a schematic sectional view showing a case where the charged particles C are disposed on the counter electrode side, FIG. 6B is a schematic sectional view showing a case where the charged particles C are disposed on the pixel electrode side, and FIG. 6C is a graph showing changes in terms of time in the counter electrode voltage and the pixel electrode voltage after the power is turned off;

FIGS. 11A and 11B show charts corresponding to the drive waveform of FIG. 9 according to the second embodiment, in which FIG. 11A is a schematic sectional view showing a state where the charged particles C are disposed on the counter electrode side, and FIG. 11B is a graph showing changes in terms of time in the counter electrode voltage and the pixel electrode voltage after the power is turned off;

FIGS. 12A and 12B show charts corresponding to the drive waveform of FIG. 10 according to the second embodiment, in which FIG. 12A is a schematic sectional view showing a state where the charged particles C are disposed on the pixel electrode side, and FIG. 12B is a graph showing changes in terms of time in the counter electrode voltage and the pixel electrode voltage after the power is turned off;

DETAILED DESCRIPTION OF THE PREFERRED EMBODIMENTS

Figure 1:
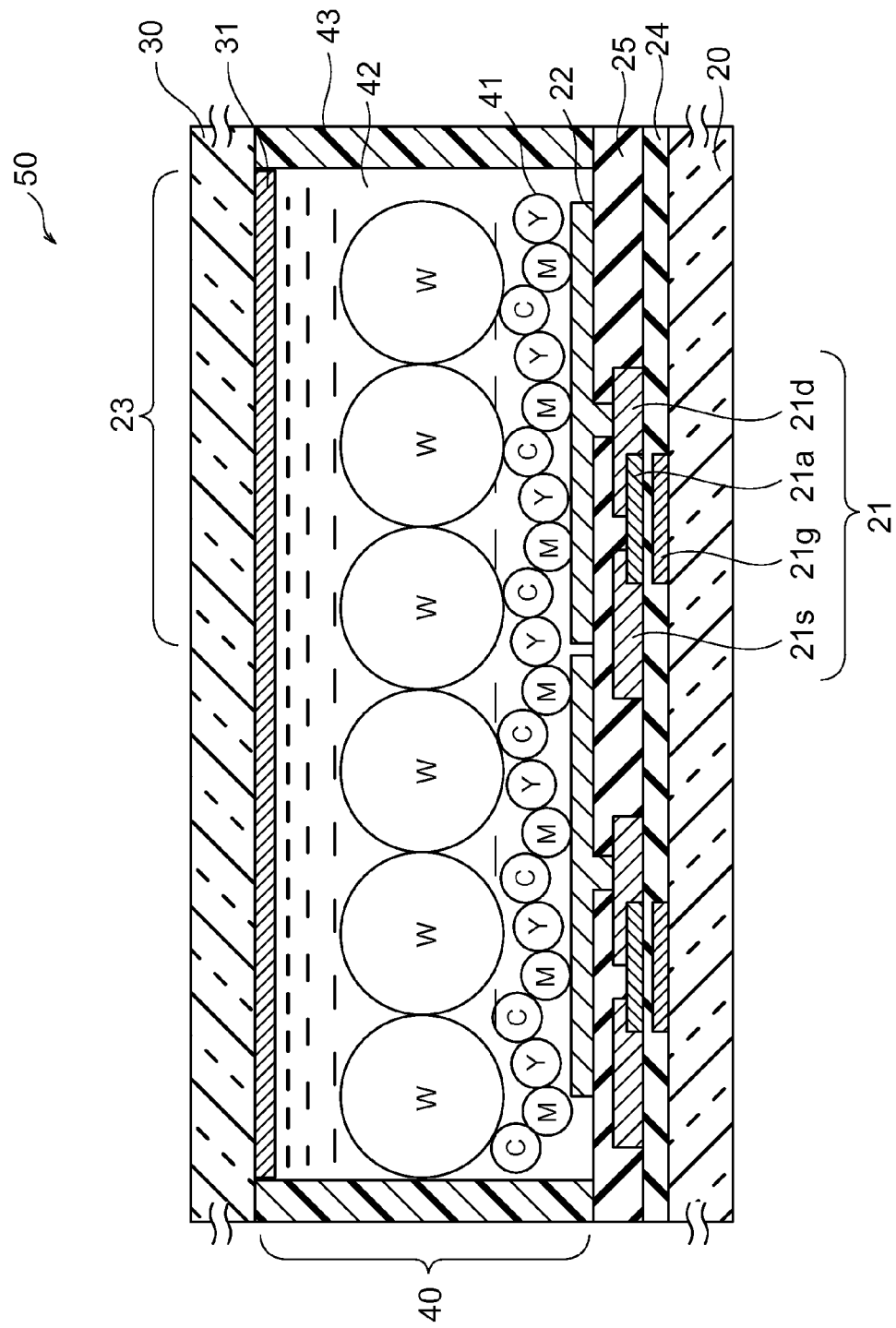
FIG. 1 is a fragmentary sectional view conceptually showing a display unit which constitutes an image display device according to a first embodiment.

Hereinafter, modes for embodying the present invention (referred to as "embodiments" hereinafter) will be described by referring to the accompanying drawings. In Description and Drawings, same reference numerals are used for the substantially same structural elements. The shapes in the drawings are illustrated to be easily comprehended by those skilled in the art, so that sizes and ratios thereof are not necessarily consistent with the actual ones.

First Embodiment

First, the outline of a first embodiment will be described by referring to FIG. 1 to FIG. 3.

An image display device 10 with a memory according to the first embodiment includes: a TFT glass substrate 20 as a first substrate on which a plurality of pixels 23 each having a TFT 21 as a switching element and a pixel electrode 22 are arranged in matrix; a counter substrate 30 as a second substrate on which a counter electrode 31 is formed; a electrophoretic layer 40 formed by containing electrophoretic particles 41, which is interposed between the TFT glass substrate 20 and the counter substrate 30; a display unit 50 which includes the TFT substrate 20, the counter substrate 30, and the electrophoretic layer 40; and a voltage application unit 60 which updates the display state of the display unit 50 to a next screen of a prescribed color density by applying a voltage to the electrophoretic particles 41 via the pixel electrode 22 and the counter electrode 31 in a screen update period.

The electrophoretic particles 41 contain three kinds of charged particles C (cyan), M (Magenta), Y (yellow) which are mutually different in colors and threshold voltage for starting electrophoresis. Provided that the threshold voltages of the charged particles C (cyan), M (magenta), and Y (yellow) are Vth3, Vth2, and Vth1, respectively, those voltages satisfy the relation of |Vth3|<|Vth2|<|Vth1|. Further, the voltage application unit 60 applies a voltage VE that is different from the reference potential in a final period of the screen update period. The voltage VE is a compensation voltage which suppresses the movement of the charged particles C. That is, the first embodiment is a case where "n" in the scope of the appended claims is "3".

Provided that a definite integral regarding the potential difference between the pixel electrode 22 and the counter electrode 31 by the time from the point at which apply of the voltage by the voltage application unit 60 is ended until ∞ is defined as ∫ΔVdt=∫(Vpix−Vcom)dt and the absolute value of the definite integral when the voltage 0 is applied in the final period and the absolute value of the definite integral when the voltage VE is applied in the final period are |∫ΔVdt (0)| and |∫ΔVdt (VE≠0)|, respectively, the voltage VE may be defined to satisfy the relation of |∫ΔVdt (0)|>|∫ΔVdt (VE≠0)|. The "definite integral" herein may be an approximate value.

It is assumed that the relative color densities of the charged particles C, M, and Y in each of the pixels 23 constituting the next screen to be updated are R3, R2, and R1, respectively, and the screen update period includes a first period, a second period, a third period, and a final period. In this case, in the first period, a first voltage V1, −V1, or 0 is applied while keeping the charged particles Y as the relative color density R1. In the second period, a second voltage V2, −V2, or 0 is applied and the charged particles M are set to be the relative color density R2 while keeping the charged particles Y as the relative color densities R1. In the third period, a third voltage V3, −V3, or 0 is applied and the charged particles C are set to be the relative color density R3 while keeping the charged particles Y, M as the relative color densities R1, R2, respectively. Further, the threshold voltages Vth3, Vth2, Vth1 and the voltages to be applied V3, V2, V1, VE may be defined to satisfy the relations of |Vth3|<|V3|<|Vth2|<|V2|<|Vth1|<|V1| and 0<|VE|<|V3|.

Next, the first embodiment will be described in a more detailed manner by adding FIGS. 4 to 8 to FIGS. 1 to 3.

Figure 2:
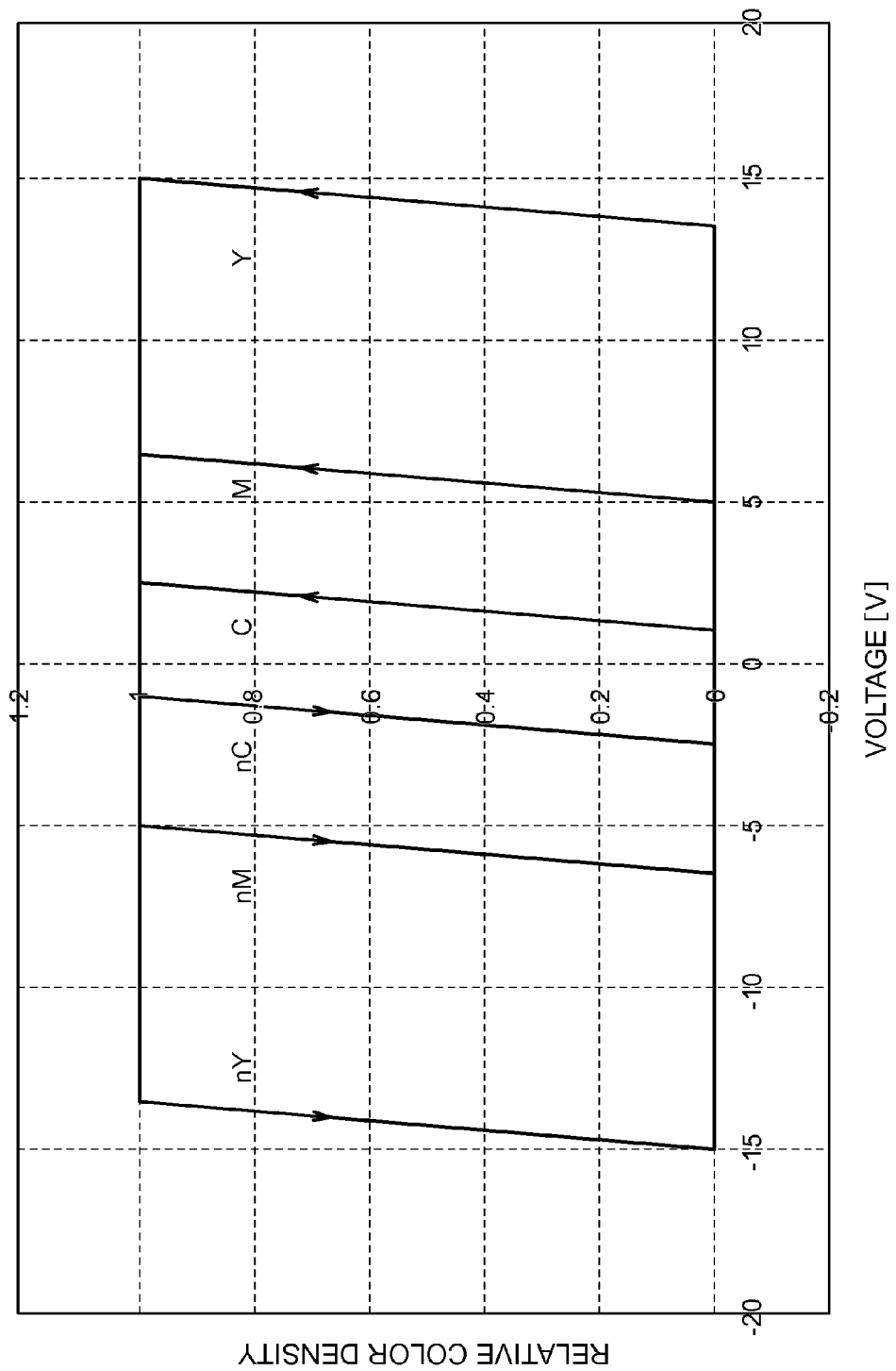
FIG. 2 is a graph showing the principle of color display of the image display device according to the first embodiment.

FIG. 1 is a sectional view which conceptually shows the display unit 50 that constitutes the image display device 10 (FIG. 3) of the first embodiment. The image display device 10 is an active matrix type color electrophoretic display device. The display unit 50 is formed with an electrophoretic display element having a memory capable of providing color display by active matrix drive, which is constituted with the TFT glass substrate 20, the counter substrate 30, and the electrophoretic layer 40 sealed between the TFT glass substrate 20 and the counter substrate 30. The peripheral edges of the TFT glass substrate 20 and the counter substrate 30 are sealed by a seal member 43.

On the TFT glass substrate 20, a large number of TFTs 21 as the switching elements arranged in matrix, the pixel electrodes 22 each of which is connected to each of the TFTs 21, and gate lines as well as data lines, not shown, are provided. The TFT 21 is a typical one which includes a semiconductor layer 21a, a gate electrode 21g, a source electrode 21s, a drain electrode 21d, and the like. Further, a part of an insulating film 24 is a gate insulating film, and the drain electrode 21d and the pixel electrode 22 are electrically connected via a contact hole that is provided in an insulating film 25.

The electrophoretic layer 40 is constituted with a solvent 42 and the charged particles C, M, Y as well as white particles W dispersed in the solvent 42. The charged particles C, M, and Y are nanoparticles, and each of those has colors of cyan (C), magenta (M), yellow (Y) and charged to either plus or minus. The white particles W are uncharged or weak-charged with which the particles hardly migrate for the electric field. The charged amounts of the three colors of charged particles C, M, and Y are different, so that the absolute values of the threshold voltages at which migration thereof is started in the solvent 42 are different. In the first embodiment, the charged particles C, M, and Y are all charged to the same polarity (positive polarity).

Further, a counter electrode voltage Vcom which defines the reference potential of the display unit 50 is supplied to the counter electrode 31 formed on the counter substrate 30. Actions of the display unit 50 are done by moving the three colors of charged particles C, M, and Y from the TFT glass substrate 20 side to the counter substrate 30 side or from the counter substrate 30 side to the TFT glass substrate side 20 by applying a voltage corresponding to pixel data between the pixel electrode 22 and the counter electrode 31. In the first embodiment, the counter electrode 31 side is the display face (this is the same in other embodiments as well).

Next, the principle of color display of the display unit 50 will be described by referring to FIG. 2. In the first embodiment, the threshold voltages Vth(c), Vth(m), and Vth(y) of the three kinds of charged particles C, M, and Y in the drawing are set to satisfy the relation of |Vth(c)|<|Vth(m)|<|Vth(y)|. That is, the threshold voltages Vth(c), Vth(m), and Vth(y) correspond to examples of the above-described threshold voltages Vth3, Vth2, and Vth1, respectively.

As can be seen from FIG. 2, first, behavior of the charged particles C can be described as follows. When a plus voltage is applied and the voltage becomes equal to or larger than the threshold voltage Vth(c), the charged particles C migrate to the counter substrate 30 side from the TFT glass substrate 20 side. Thereby, the display density of cyan becomes thicker and reaches the display density of cyan before the voltage reaches the threshold voltage Vth(m). When a minus voltage is applied in this state and the voltage becomes equal to or less than the threshold voltage −Vth(c), the charged particles C migrate to the TFT glass substrate 20 side from the counter substrate 30 side. Thereby, the display density of cyan becomes lighter and the display density of cyan reaches the lowest before the voltage reaches the threshold voltage −Vth(m). Similarly, regarding the charged particles M, the display density increases (or decreases) when the voltage is equal to or larger than the threshold voltage Vth(m) (or equal to or less than the threshold voltage −Vth(m)). Regarding the charged particles Y, the display density increases (or decreases) when the voltage is equal to or larger than the threshold voltage Vth(y) (or equal to or less than the threshold voltage −Vth(y)). As described, the charged particles C, M, and Y have threshold values different from each other, so that it is possible to move each of the charged particles C, M, and Y by applying different voltages.

Next, the circuit structure of the image display device 10 will be described. FIG. 3 is a block diagram showing the electrical structure of the image display device 10. The image display device 10 is an electrophoretic display device, which includes the display unit 50 that is an electronic paper capable of providing color display, and the voltage application unit 60 which drives the display unit 50. The display unit 50 is constituted with an electronic paper, that is, an electrophoretic display element having a memory capable of providing color display. The voltage application unit 60 is constituted with a gate driver 61 which performs shift-resistor operations, a multi-value output data driver 62, an electronic paper module substrate 70, and the like.

The gate driver 61 is connected to each gate line of the display unit 50 via FPC connectors 63, 64, and supplies, to the gate lines, gate signals which shift-operate in an active period successively. The data driver 62 is connected to each data line of the display unit 50 via FPC connectors 65, 66, and supplies, to the data lines, data signals written to the pixel electrodes 22. When the gate signal for turning on the TFT 21 is supplied to the gate line, the TFT 21 connected to the gate line is turned on, and the data signal is written from the data line to the pixel electrode 22 that is connected to the TFT 21.

On the electronic paper module substrate 70, an electronic paper controller 71 for driving the display unit 50, a graphic memory 72 which constitutes a frame buffer, a CPU (Central Processing Unit) 73 which controls each unit of the device and gives image data to the electronic paper controller 71, a main memory 74 such as ROM or RAM, a storage device 75, and a data transmission/reception unit 76 are provided.

The electrophoretic display element constituting the display unit 50 has a memory. Therefore, when the screen is maintained without updating it, it is preferable not to scan the display unit 50 and also to turn off the power of all the voltages of the gate-on voltage, the gate-off voltage, the data voltage, the counter electrode voltage, and the logic system supplied to the gate driver 61, the data driver 62, and the counter electrode 31.

Next, the TFT driving method of the display unit 50 will be described. As in the case of a liquid crystal display device, for driving the TFTs of the electrophoretic display element, gate signals are applied to the gate lines by shifting the signals for each line to execute a writing action of the data signals to the pixel electrodes 22 via the TFTs 21 as the switching elements. Further, the time in which writing for all the lines is completed is defined as one frame, and one frame is scanned at 60 Hz (16.6 ms cycle), for example. In the liquid crystal display device, normally, the entire image is switched in one frame. In the meantime, the response speed of the electrophoretic display element is slower than that of the liquid crystal so that the screen cannot be switched unless a voltage is continuously supplied during a plurality of frame periods (referred to as "sub-frame periods" hereinafter in the electrophoretic display element, and a period of screen update constituted with a plurality of sub-frame periods is referred to as "screen update period").

Therefore, in the display unit 50, employed is a PWM (Pulse Width Modulation) drive which continuously applies a fixed voltage during a plurality of sub-frame periods. Further, color display and gradation display are provided by applying a fixed voltage V1 (V2 or V3) set in advance for a prescribed number of sub-frames. Hereinafter, explanations will be provided by converting to the CMY-based color densities same as the colors of three charged particles C, M, and Y for showing arbitrary display colors. As the color densities, employed are (C, M, Y)=(Rc, Rm, Ry) (Rc, Rm, Ry=0-1), and (C, M, Y)=(0, 0, 0) shows a white state while (C, M, Y)=(1, 1, 1) shows a black state.

Further, the applied voltages V1, V2, and V3 are set to satisfy the relations of |Vth(c)|<|V3|<|Vth(m)|, |Vth(m)|<|V2|<|Vth(y)|, and |Vth(y)|<|V1|. Specifically, |Vth(c)|≈1 (V) (roughly no threshold value), |Vth(m)|≈5 (V), and |Vth(y)|≈13 (V), and the drive voltages are set as |V3|=3 (V), |V2|=7 (V), and |V1|=15 (V) (see FIG. 2).

In the first embodiment, for displaying a final transition state N (also referred to as "next screen" hereinafter) which is a display state after updating an image from a previous display state CUR (also referred to as "current screen" hereinafter), a systematic and simple driving method including neutral color/gradation displays via intermediate transition states (WK, I1, I2). Further, a prescribed image is updated by executing the drive over a plurality of sub-frames. The drive period over a plurality of sub-frames is constituted with: a reset period for transiting to a base state of white (W) or black (K); a first sub-frame group period where a voltage of V1, 0, -V1 (V) is applied; a second sub-frame group period (a second voltage applying period) where a voltage of V2, 0, -V2 (V) is applied; a third sub-frame group period where a voltage of V3, 0, -V3 is applied (a third voltage applying period); and a final sub-frame period where a voltage of a compensation voltage VE (V) to be described later is applied. Note here that V1, V2, V3, and VE satisfy the relation of |V1|>|V2|>|V3|>|VE|. That is, "the first sub-frame group period", "the second sub-frame group period", "the third sub-frame group period", and "the final sub-frame period" correspond to examples of "the first period", "the second period", "the third period", and "the final period" described above, respectively.

Figure 4:
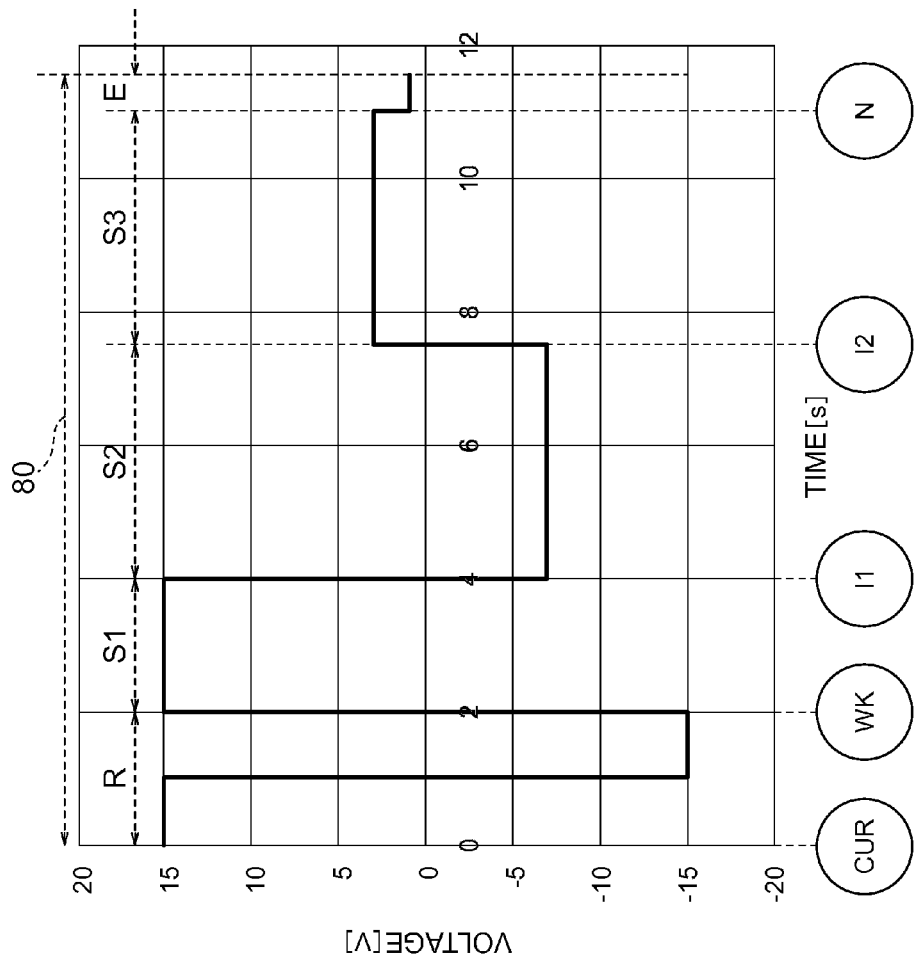
FIG. 4 is a graph showing a drive waveform for displaying green according to the first embodiment.

FIG. 4 shows a drive waveform for displaying green in which the relative color density of the charged particles C, M, and Y becomes (C, M, Y)=(1, 0, 1) as the display information of the pixels 23 of the image to be displayed (next screen N to be updated).

In the first sub-frame group period S1, +V1=+15 (V) is applied to transit the state to the first intermediate transition state (I1): (1, 1, 1) where the relative color density of the charged particles Y becomes 1 from the base state of white (W) or black (K). In the second sub-frame group period S2, -V2=-7 (V) is applied to transit to the second intermediate transition state (I2): (0, 0, 1) where the Y density is 1 and the M density becomes 0 from the first intermediate transition state (I1). In the third sub-frame group period S3, +V3=+3 (V) is applied to transit to the final transition state N: (1, 0, 1) from the second intermediate transition state. In the final sub-frame period E is a period where unnecessary movement of the electrophoretic particles 41 is suppressed when the power of the display unit 50 is turned off and shifted to a retention period and the relative color density N of the final transition state is established, so that there is almost no change in the relative color density.

The period including the first to third sub-frame group periods S1 to S3 and the final sub-frame period E is called a screen update period 80. Thereafter, the gate signal and the data signal are stopped, and the supply of the voltages to the gate voltage, the data voltage, and the counter electrode voltage is tuned off to set those to the reference potential (GND).

Next, reasons for providing the final sub-frame period E for applying the voltage of the compensation voltage VE (V) will be described.

With the drive methods of the related techniques (Patent Documents 3, 5, and 6), the drive is terminated by applying the data signal of 0 (V) in the final sub-frame period of the screen update period. This is because the screen update period ends while the voltage is being applied to the pixel electrodes when the screen update period is ended while keeping the applied drive voltage, so that the charged particles greatly move over the time. Therefore, the color is changed greatly from the target final transition state N.

Figure 5:
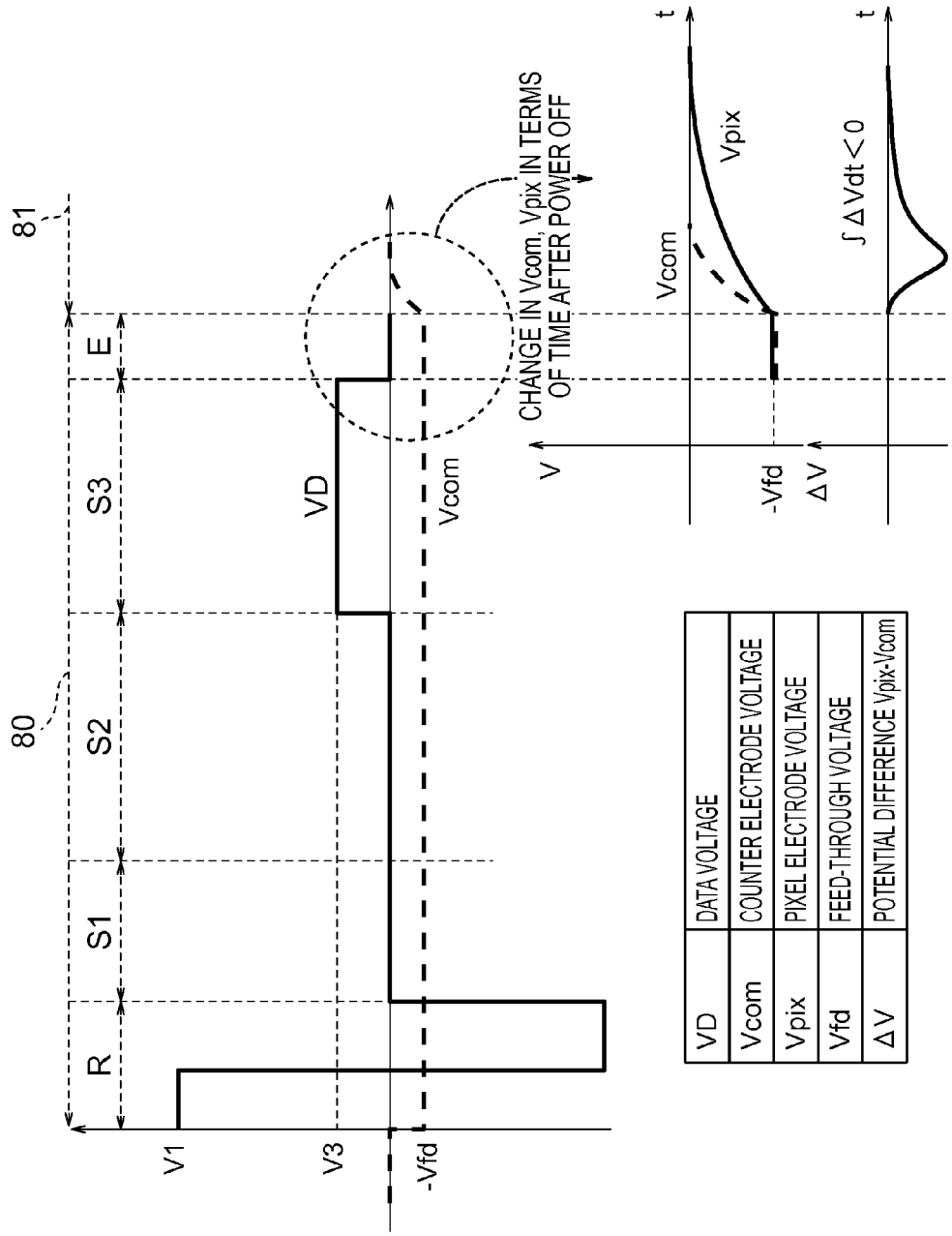
FIG. 5 is a graph showing a drive waveform which terminates the data voltage in a final sub-frame period at 0 in a comparative example of the first embodiment.

FIG. 5 shows a drive waveform which terminates the data voltage in the final sub-frame period E at 0 (V) (Patent Document 7 and the like). The longitudinal axis shows the voltage, the lateral axis shows the time, VD is the data voltage, and Vcom shows the counter electrode voltage. Further, V1 is the drive voltage of the charged particles Y, V2 is the drive voltage of the charged particles M, V3 is the drive voltage of the charged particles C, V1 is about 15 (V), V2 is about 7 (V), and V3 is about 3 (V). The screen update period 80 is about 12 (s).

Further, also shown in FIG. 5 is an enlarged view of the period for shifting from the final sub-frame period E to the retention period 81 near the end of the screen update period 80. Vcom is the counter electrode voltage, Vpix is the pixel electrode voltage, and $\Delta V = Vpix - Vcom$ shows the potential difference between the pixel electrode 22 and the counter electrode 31. In the screen update period 80, the counter electrode voltage is adjusted to be minus with respect to the reference potential by the amount of the feed-through voltage Vfd, i.e., Vcom=-Vfd. Further, since VD=0 (V) is written in the final sub-frame period E, the pixel electrode voltage becomes Vpix=-Vfd which is shifted to minus for the mount of the feed-through. Thus, in the final sub-frame period E, the potential difference between the pixel electrode 22 and the counter electrode 31 is $\Delta V = 0$ (V).

After the screen update period 80 ends, the power of the display power circuit is turned off to stop the supply of the power to the counter electrode 31, the gate driver 61, and the data driver 62. Further, the counter electrode voltage Vcom is discharged to the reference potential (GND, 0 (V)) while changing at a time constant of the panel equivalent circuit of the counter electrode 31. The pixel electrode voltage Vpix is discharged to the reference potential (GND, 0 (V)) while changing at a time constant of the panel equivalent circuit of the pixel electrode 22. Those time constants are generally considered to be about 1 (s).

As described above, the time constants of the panel equivalent circuits are different for the counter electrode voltage Vcom and the pixel electrode voltage Vpix. Thus, there is a potential difference generated between the pixel electrode 22 and the counter electrode 31 during the time from the point at which the power supply is stopped and the counter electrode voltage Vcom and the pixel electrode voltage Vpix change to the reference potential (GND). Here, the time product of the potential difference between the pixel electrode 22 and the counter electrode 31 is defined as follows.

$$\int \Delta V dt = \int (Vpix - Vcom) dt \quad (\int \text{ is time product from the power-off to } \infty)$$

Figure 6C:
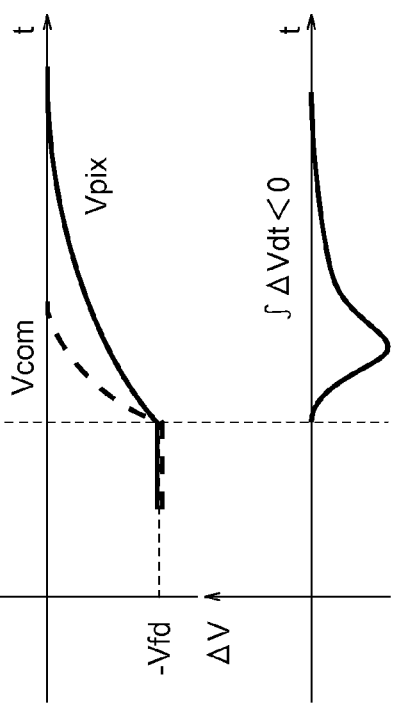
Figure 6A:
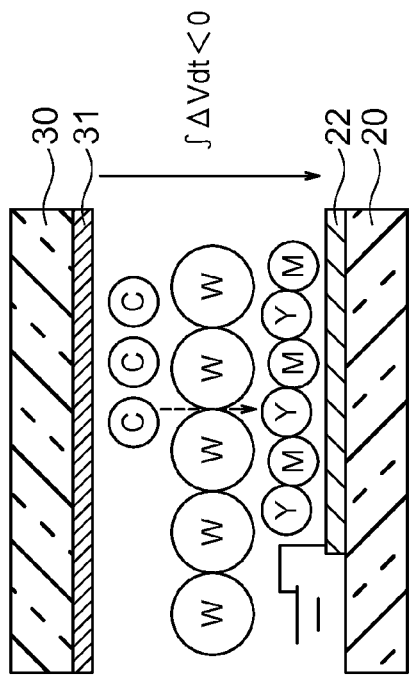
Figure 6B:
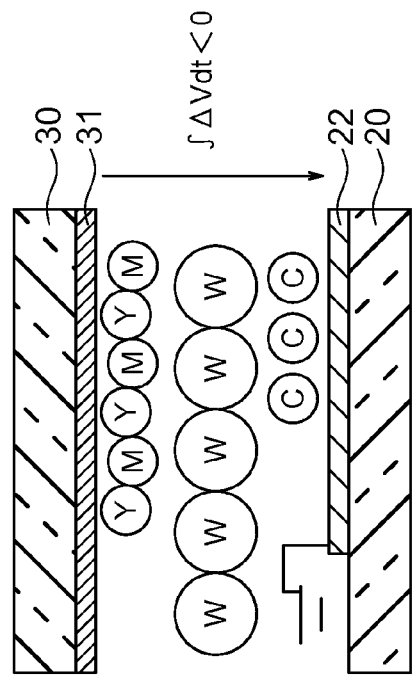

FIG. 6 shows charts for describing the influence of the time product $\int \Delta V dt$ of the potential difference between the pixel electrode 22 and the counter electrode 31 imposed upon the charged particles C of the maximum charged amount in a case where the time constant of the panel equivalent circuit of the pixel electrode voltage Vpix is larger than the time constant of the panel equivalent circuit of the counter electrode voltage Vcom. FIG. 6A shows the state of the charged particles C, M, and Y when the charged particles C are disposed on the counter electrode 31 side, while FIG. 6B shows the state thereof when the charged particles C are disposed on the pixel electrode 22 side, respectively.

In such case, the time product is $\int \Delta Vdt<0$ as shown in FIG. 6C so that an electric filed is applied to the pixel electrode 22 side from the counter electrode 31 side after the power is turned off. Thus, when the final transition state N is in cyan (FIG. 6A), the cyan particles (charged particles C) which are positive large charged particles disposed on the counter electrode 31 side before the power is turned off may move to the pixel electrode 22 side after the power is turned off. When that happens, the image display color becomes faded and pale as shown in FIG. 6A. In the meantime, when the final transition state N is in red that is a complementary color of cyan (FIG. 6B), the charged particles C are already disposed on the pixel electrode 22 side and do not move again. As a result, there is no fading of the image display color as shown in FIG. 6B so that the display state of the image does not change.

Inversely, the time product $\int \Delta Vdt$ of the potential difference between the pixel electrode 22 and the counter electrode 31 becomes $\int \Delta Vdt>0$ in a case where the time constant of the panel equivalent circuit of the pixel electrode voltage Vpix is smaller than the time constant of the panel equivalent circuit of the counter electrode voltage Vcom. Thus, an electric field is generated from the pixel electrode 22 towards the counter electrode 31 after the power is turned off. Therefore, while the charged particles C are disposed on the pixel electrode 22 side before the power is turned off when the final transition state N is in white (W), for example, the charged particles C may move to the counter electrode 31 side (display face side) after the power is turned off. When that happens, white in the image is lightly colored into cyan.

As described above, the display unit 50 of the first embodiment has a plurality of different charged amounts. Thus, when the drive voltages V1 to V3 are set smaller to cut the power consumption to make the best use of the characteristic of the electronic paper, the threshold value of the electrophoretic particles of the maximum charged amount becomes about 1 V and the drive voltage becomes about 3 V so that the particles are to move even with a weak voltage. This is a peculiar issue of color display, which is not an issue with the electrophoretic display element for monochrome display. Thus, after the screen update period 80 ends, the cyan particles that are the large charged particles move due to the time product $\int \Delta Vdt$ of the potential difference between the pixel electrode 22 and the counter electrode 31 generated when the power supplied to the display unit 50 is turned off. Therefore, it is found that there is such an issue that the retention capability (memory) of the screen is deteriorated.

In order to eliminate the influence of the time product $\int \Delta Vdt$ of the potential difference between the pixel electrode 22 and the counter electrode 31 so that the cyan particles of the maximum charged amount do not move, the data voltage VE for compensation applied in the final sub-frame period E may be adjusted to satisfy $\int \Delta Vdt \approx 0$.

Figure 7:
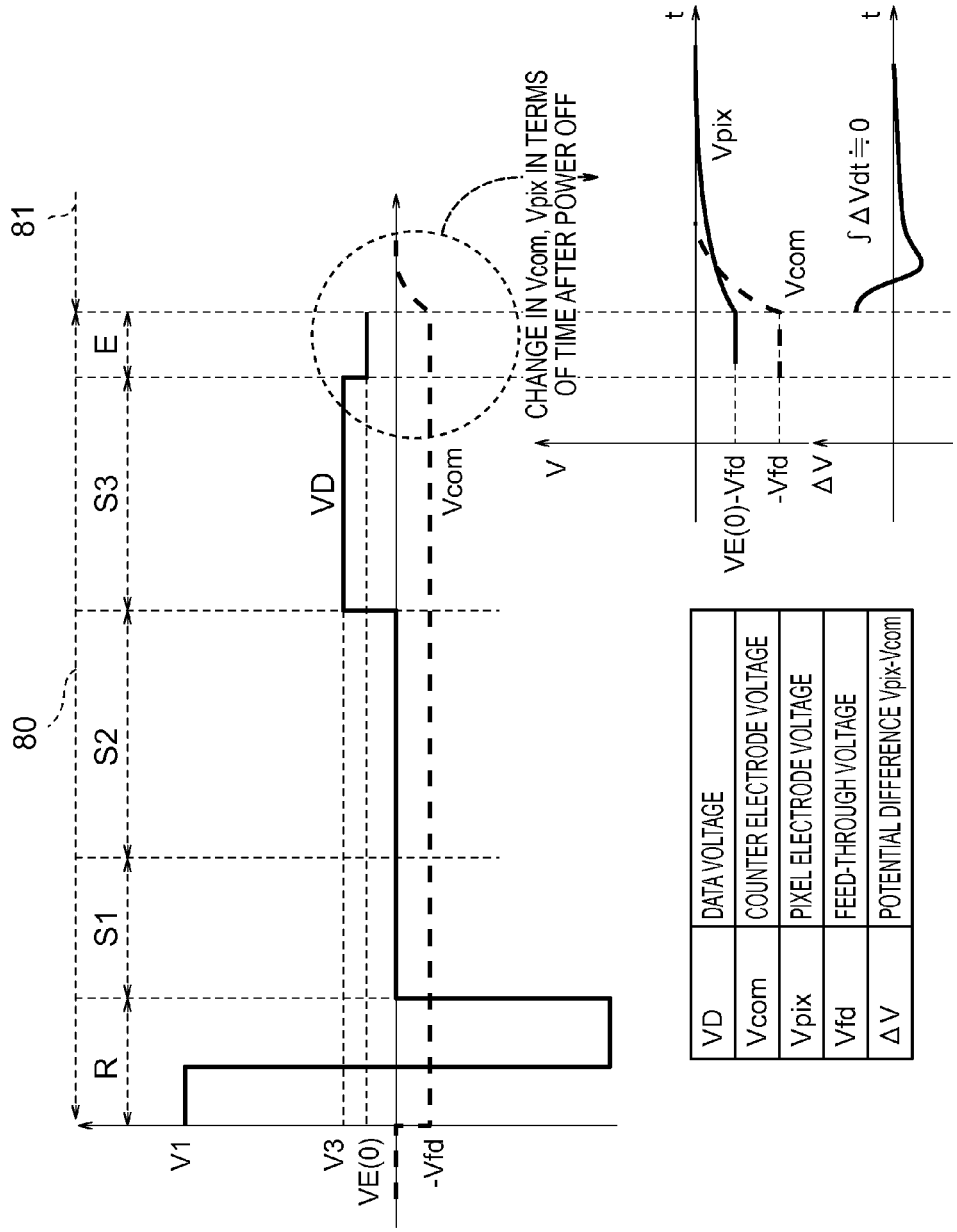
FIG. 7 is a graph showing a drive waveform for displaying cyan in a case where the voltage in a final sub-frame period is terminated to non-zero VE according to the first embodiment.
Figure 8:
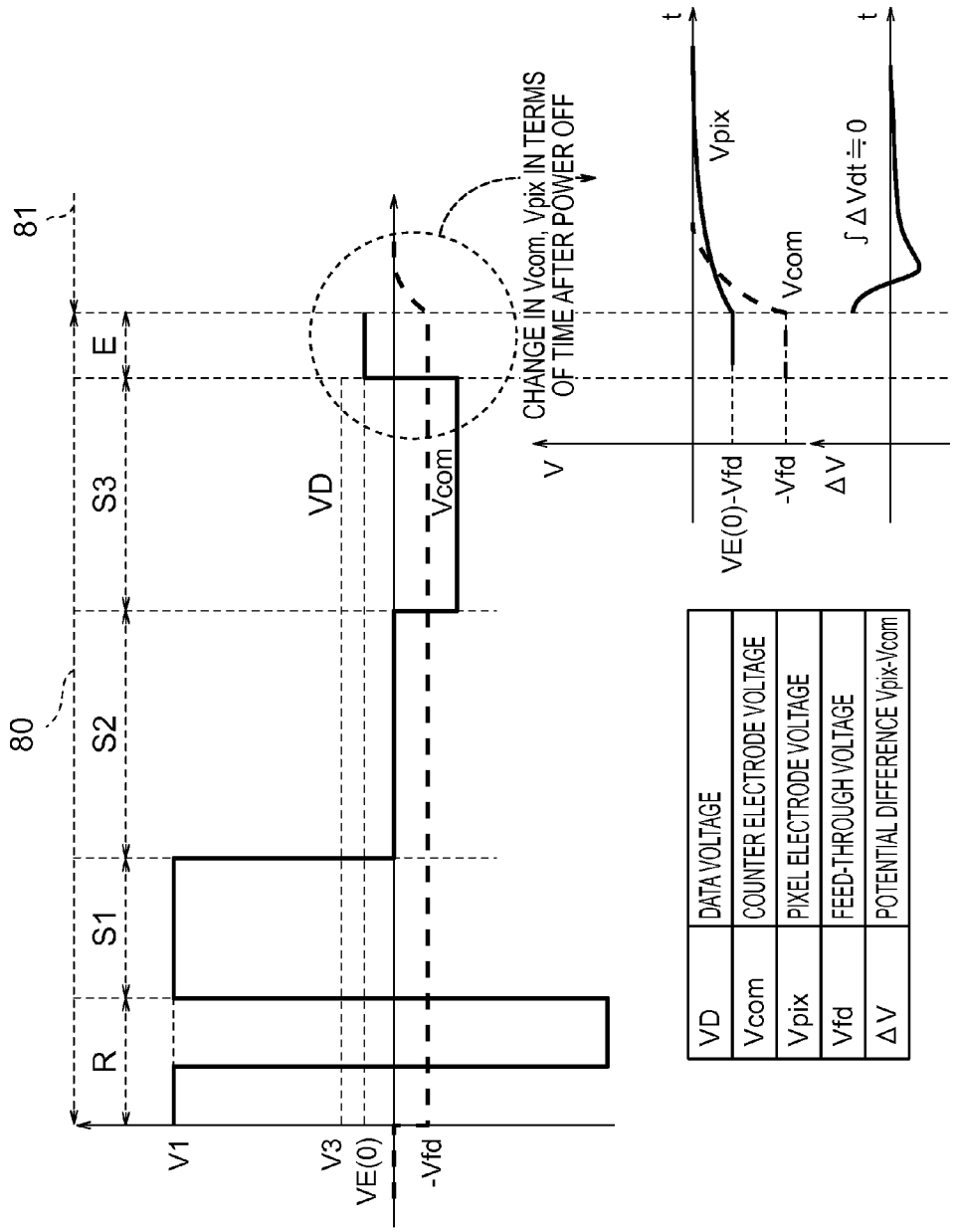
FIG. 8 is a graph showing a drive waveform for displaying red in a case where the voltage in a final sub-frame period is terminated to non-zero VE according to the first embodiment.

FIG. 7 and FIG. 8 show the drive waveforms of the first embodiment which terminate the voltage of the final sub-frame period at non-zero VE. FIG. 7 is a drive waveform of cyan, and FIG. 8 is a drive waveform of red that is a complementary color of cyan. In the first embodiment, the voltage is terminated at the non-zero voltage VE (0) regardless of the final transition state N whether the cyan particles (charged particles C) which are the maximum charged amount electrophoretic particles are on the counter electrode 31 side or the on the pixel electrode 22 side.

Note here that VD is the data voltage, Vcom is the counter electrode voltage, V1 to V3 are drive voltages of each of the particles, and VE is a value that is larger than 0 (V) and smaller than V3. Hereinafter, explanations will be provided on an assumption that the panel circuit time constant τpix of the pixel electrode voltage Vpix is larger than the panel circuit time constant τcom of the counter electrode voltage Vcom and τcom=a×τ, τpix=τ. Further, a is a=τcom/τpix, which is a ratio between the panel circuit time constant τcom of the counter electrode voltage Vcom and the panel circuit time constant τpix of the pixel electrode voltage Vpix.

In FIG. 7, also presented is an enlarged view which shows the state of discharging the voltage from the pixel electrode 22 and the counter electrode 31 in the period shifted to the retention period 81 from the final sub-frame period E near the end of the screen update period 80. In the screen update period 80, the counter electrode voltage is adjusted to be minus with respect to the reference potential by the amount of the feed-through voltage Vfd, i.e., Vcom=−Vfd. Further, since the data voltage VD=VE (0) is written in the final sub-frame period E, the pixel electrode voltage becomes Vpix=VE (0)−Vfd which is shifted to minus for the mount of the feed-through.

Now, the panel equivalent circuit time constant of the counter electrode voltage Vcom is at and the panel equivalent circuit time constant of the pixel electrode voltage Vpix is τ, so that those can be expressed as follows:

$$Vpix=(VE(0)-Vfd)\exp(-t/a\tau)$$

$$Vcom=-Vfd\exp(-t/\tau).$$

Note here that t=0 shows the moment at which the panel display power is turned off, and fluctuation in the voltages of the pixel electrode 22 and the counter electrode 31 from the point at which the screen update period 80 ends to the point at which the panel display power is turned off is ignored.

At this time, the time product $\int \Delta Vdt$ of the potential difference between the pixel electrode 22 and the counter electrode 31 becomes as follows:

$$\int \Delta vdt = \int (Vpix - Vcom)dt$$
$$= (VE(0) - Vfd) \times a\tau + Vfd \times \tau$$
$$= (VE(0) \times a\tau - Vfd \times (a-1)\tau.$$

In order to satisfy the potential difference $\int \Delta Vdt \approx 0$, the voltage VE (0) may be set to satisfy the following relation.

$$VE(0)=(a-1)/a \times Vfd \qquad \text{Expression (1-1)}$$

That is, provided that the feed-through voltage Vfd=2 (V) and a=2, the voltage may be set to be about VE (0)=1 (V). That is, 0 (V)<VE (0)=1 (V)<V3=3 (V), so that the relation of 0<VE (0)<V3 is satisfied.

For increasing the compensation effect of the voltage VE (0), it is possible to provide a period where the gate signal as well as the data signal is stopped and the discharge of the pixel electrode 22 is delayed by continuously applying the gate-off voltage to the gate driver 61 while starting the discharge of the counter electrode 31 between the end of the screen update period 80 and the point at which the display power is turned off.

The case where the panel circuit time constant τpix of the pixel electrode voltage Vpix is larger than the panel circuit time constant τcom of the counter electrode voltage Vcom is an example of a case where the time product of the potential difference between the pixel electrode 22 and the counter electrode 31 becomes $\int\Delta Vdt<0$ (V) when the voltage applied in the final sub-frame period E is 0 (V). Inversely, the case where the panel circuit time constant τpix is smaller than the panel circuit time constant τcom is an example of a case where the time product becomes $\int\Delta Vdt>0$ (V) when the voltage applied in the final sub-frame period E is 0 (V). The reason for defining those as the examples is that the time product may become $\int\Delta Vdt>0$ (V) even when the panel circuit time constant τpix of the pixel electrode voltage Vpix is larger than the panel circuit time constant τcom of the counter electrode voltage Vcom and the time product may become $\int\Delta Vdt<0$ (V) even when the panel circuit time constant τpix is smaller than the panel circuit time constant τcom due to insufficient adjustment of the counter electrode voltage Vcom (the offset −Vfd of the feed-through voltage amount is shifted). That is, the movement of the charged particles C depends on the time product $\int\Delta Vdt$, so that the time product $\int\Delta Vdt$ is the substantial parameter.

Instead of the above-described structure, it is considered that the similar effect can be expected by applying not only the data voltage VD of the final sub-frame period E but also the offset voltage to the pixel electrode voltage Vpix or the counter electrode voltage Vcom over the entire screen update period 80. However, in that case, the DC offset voltage is continuously applied between the pixel electrode 22 and the counter electrode 31 through the entire screen update period 80 (about 10 (s)), so that the electrophoretic particles 41 are charged up. Thus, the electrophoretic particles 41 are moved by the charged up electric field, which is not appropriate. As in the first embodiment, through applying the appropriate compensation voltage VE (0) as the data voltage only in the final sub-frame period E, it is possible to prevent the unnecessary electric field from being applied continuously during the screen update period 80 and after the screen image is updated.

The final sub-frame period E may be defined as a final sub-frame group period constituted with a plurality of sub-frame group periods. It is needless to mention that the drive method of the update screen period 80 can be applied to all the drive waveforms that can achieve the color density of the final transition state N as long as the data applied voltage VE of the final sub-frame period E is satisfied. For example, a drive waveform which reaches the final transition state N after transited to the intermediate transition states (I1), (I2) from the previous transition state CUR without going through the base state WK and a drive waveform which reaches the final transition state N without going through the intermediate transitions states (I1), (I2) are also included in the present invention.

In the first embodiment, the electrophoretic particles 41 are constituted with nonpolar white particles W and the charged particles C, M, Y of the same polarity and different charged amounts. However, the relations regarding the charged amounts of each of the charged particles are not limited thereto. Further, it is needless to mention that a case where the charged particles C, M, Y are of different polarities and charged amounts, a case where the electrophoretic particles 41 are constituted with two particles, and a case where the electrophoretic particles 41 are constituted with more than three particles are also included in the present invention.

Further, the data voltage VD takes only three values that are the voltage +V, the voltage 0 (V), and the voltage −V in the reset period R and the first to third sub-frame groups S1 to S3, and the VD takes only one value that is the voltage VE in the final sub-frame period E. Therefore, it is possible to cut the cost through changing the voltage inputted to the driver for each sub-frame by using a simple 3-value driver which outputs three values of plus voltage/minus voltage/0 (V).

Further, instead of 0 (V) of the voltages +Vi, 0, −Vi (i=1, 2, 3) applied in the first to third sub-frame group S1 to S3, it is also possible to apply a voltage that is smaller than the minimum threshold value Vth(C).

When the above-described structure is generalized, it can be expressed as follows.

The image display device 10 with a memory, which includes:
  the TFT glass substrate 20 as the first substrate in which TFTs 21 as switching elements and the pixel electrodes 22 are arranged in matrix;
  the counter substrate 30 as the second substrate where the counter electrode 31 is formed;
  the electrophoretic layer 40 formed by containing the electrophoretic particles 41, which is interposed between the TFT glass substrate 20 and the counter substrate 30;
  the display unit 50 which includes the TFT glass substrate 20, the counter substrate 30, and the electrophoretic layer 40; and
  the voltage application unit 60 which, when updating the screen, applies a prescribed voltage to the electrophoretic particles 41 between the pixel electrode 22 and the counter electrode 31 in a prescribed period to update the display state of the display unit 50 to a next screen with a prescribed color density, wherein
  the electrophoretic particles 41 are constituted with n kinds (n is an integer of 2 or larger) of charged particles C1, - - -, Cn which are mutually different in colors and threshold voltage for starting electrophoresis,
  each of the charged particles C1, - - -, Cn exhibits a relation of "the threshold voltage |Vth(Cn)| of the charged particles Cn< - - - < the threshold voltage |Vth(C1)| of the charged particles C1", and
  when a relative color density of the charged particle C1 of each of the pixels 23 which constitute the next screen to be updated is R1, - - -, and a relative color density of the charged particles Cn is Rn, the voltage VE that is different from the reference potential is applied in the final sub-frame period E of the screen update period 80 that is the prescribed period where the voltage is applied.

Provided that the time product of the potential difference between the pixel electrode 22 and the counter electrode 31 is $\int\Delta Vdt=\int(Vpix-Vcom)dt$ ($\int$ is time product from the power-off to ∞), the absolute value of the time product when the applied voltage 0 (V) of the final sub-frame period E is supplied is $|\int\Delta Vdt|(0)$, and the absolute value of the time product when the applied voltage VE of the final sub-frame period E is supplied is $|\int\Delta Vdt(VE\ne 0)|$, the applied voltage VE is defined to satisfy the relation of $|\int\Delta Vdt(0)|>|\int\Delta Vdt(VE\ne 0)|$. The "definite integral" herein may be an approximate value.

Further, it can also be generalized as follows.

Provided that the relative color density of the charged particles Cm in each of the pixels constituting the next screen to be updated is Rm, the screen update period includes all the periods from the first period to the n-th period and the final period, in the first period, the first voltage V1, −V1, or 0 is applied and the charged particles C1 is turned to the relative color density R1, in the m-th period, the m-th voltage Vm, −Vm, or 0 is applied and the charged particle Cm is turned to the relative color density Rm while keeping the charged particles from C1 to C(m−1) as the relative color densities R1 to R(m−1), respectively, and the threshold voltage and the voltage to be applied satisfy the relations of $|Vth(Cm)|<|Vm|<|Vth(C(m-1))|$, $|Vth(C1)|<|V1|$, and $0<|VE|<|Vn|$.

With the first embodiment, in the image display device 10 that is the color electrophoretic display element using the charged particles C, M, and Y which are mutually different in colors and threshold voltage for starting electrophoresis, movement of the charged particles C having the largest charged amount (small threshold voltage) can be suppressed after the power is turned off through compensating the potential difference ΔV between the pixel electrode 22 and the counter electrode 31 generated at the time of turning off the power for display. Therefore, the retention capability (memory) of the screen can be improved.

Second Embodiment

Figure 3:
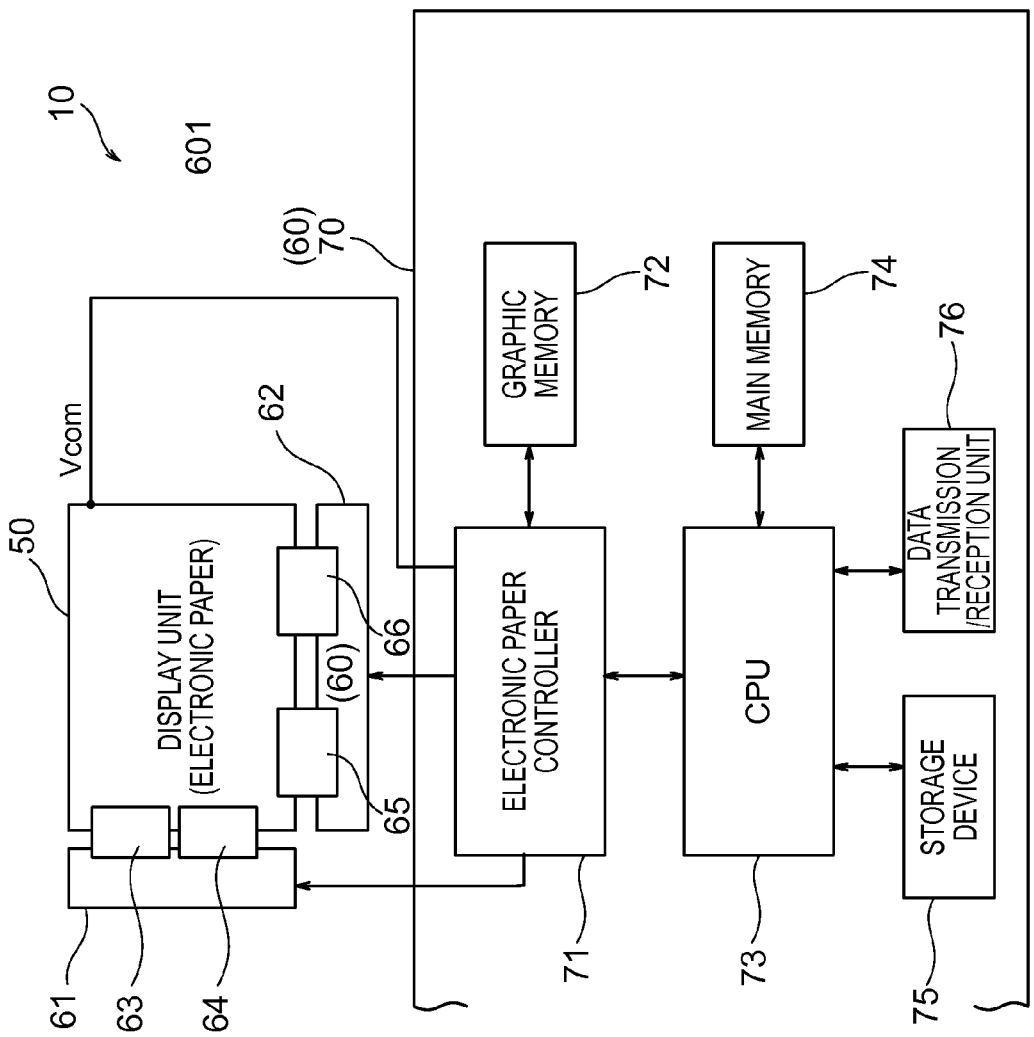
FIG. 3 is a block diagram showing the electric structure of the image display device according to the first embodiment.

A second embodiment has the same structure as that of the first embodiment except that a part of the functions of the voltage application unit 60 shown in FIG. 3 is different. Thus, first, the outline of the second embodiment will be described by referring to FIG. 1 to FIG. 3 as in the case of the first embodiment.

The image display device 10 with a memory according to the second embodiment includes: a TFT glass substrate 20 as a first substrate on which a plurality of pixels 23 each having a TFT 21 as a switching element and a pixel electrode 22 are arranged in matrix; a counter substrate 30 as a second substrate on which a counter electrode 31 is formed; a electrophoretic layer 40 formed by containing electrophoretic particles 41, which is interposed between the TFT glass substrate 20 and the counter substrate 30; a display unit 50 which includes the TFT substrate 20, the counter substrate 30, and the electrophoretic layer 40; and a voltage application unit 60 which updates the display state of the display unit 50 to a next screen of a prescribed color density by applying a voltage to the electrophoretic particles 41 via the pixel electrode 22 and the counter electrode 31 in a screen update period.

The electrophoretic particles 41 contain three kinds of charged particles C (cyan), M (Magenta), and Y (yellow) which are mutually different in colors and threshold voltage for starting electrophoresis. Provided that the threshold voltages of the charged particles C (cyan), M (magenta), and Y (yellow) are Vth3, Vth2, and Vth1, respectively, those voltages satisfy the relation of $|Vth3|<|Vth2|<|Vth1|$. Further, provided that the relative color density of the charged particles C, M, Y in each pixel 23 constituting the next screen to be update are R3, R2, and R1, the voltage application unit 60 applies a voltage VE (R3) that depends on the relative color density R3 in the final period of the screen update period. The voltage VE (R3) is a compensation voltage which suppresses the movement of the charged particles C. That is, the second embodiment is a case where "n" in the scope of the appended claims is "3".

The voltage VE (R3) may be defined to be different for the voltage VE (R3=1) when the relative color density R3 is 1 and for the voltage VE (R3=0) when the relative color density R3 is 0. At this time, the voltage VE (R3=1) and the voltage VE (R3=0) may also be defined as VE (R3=0)≠0 when VE (R3=1)=0, or VE (R3=0)=0 when VE (R3=1)≠0.

The screen update period includes a first period, a second period, a third period, and a final period. In this case, in the first period, a first voltage V1, −V1, or 0 is applied and the charged particles Y are set to be the relative color density R1. In the second period, a second voltage V2, −V2, or 0 is applied and the charged particles M are set to be the relative color density R2 while keeping the charged particles Y as the relative color densities R1. In the third period, a third voltage V3, −V3, or 0 is applied and the charged particles C are set to be the relative color density R3 while keeping the charged particles Y, M as the relative color densities R1, R2, respectively. Further, the threshold voltages Vth3, Vth2, Vth1 and the voltages V3, V2, V1, VE to be applied may be defined to satisfy the relations of $|Vth3|<|V3|<|Vth2|<|V2|<|Vth1|<|V1|$ and $0<|VE|<|V3|$.

Next, the second embodiment will be described in a more detailed manner by adding FIG. 4 and FIGS. 9 to 12 to FIGS. 1 to 3.

In the first embodiment, migration of the electrophoretic particles 41 when the supplied voltage of the display system is turned off is suppressed by setting the time product ∫ΔVdt of the potential difference between the pixel electrode 22 and the counter electrode 31 as almost 0 through setting the data voltage of the final sub-frame period E as the appropriate VE regardless of the final transition state N whether the cyan particles (charged particles C) which are the maximum charged amount electrophoretic particles are on the counter electrode 31 side or on the pixel electrode 22 side.

However, the panel equivalent time constant of the counter electrode 31 at the time of turning off the power may be changed due to variation in the transfer resistance or the surface resistance of the counter electrode 31. Further, the panel equivalent circuit time constant of the pixel electrode 22 depends on the leak current of the TFT 21, so that it may be changed depending on the surrounding environments such as brightness, temperatures, and the like.

Thus, in the second embodiment, the voltage VE is not set so that the time product ∫ΔVdt almost satisfies 0 but an allowable margin is given for adjusting the voltage VE. That is, the second embodiment is a drive method which applies different data voltages VD in the final sub-frame period E depending on whether the cyan particles (charged particles C) which are the maximum charged amount particles are on the counter electrode 31 side or on the pixel electrode 22 side according to the final transition state N.

The structure of the display unit 50 according to the second embodiment is the same as that of the first embodiment. The drive method according to the second embodiment employs a PWM drive in which a prescribed image is updated by continuously applying a specific voltage during a plurality of sub-frame periods as in the case of the drive method according to the first embodiment.

The drive period over a plurality of sub-frames is constituted with: a reset period R for transiting to the base state of white (W) or black (K); a first sub-frame group period S1 where a voltage of V1, 0, −V1 is applied; a second sub-frame group period S2 where a voltage of V2, 0, −V2 is applied; a third sub-frame group period S3 where a voltage of V3, 0, −V3 is applied; and a final sub-frame period E where different voltages VE (N) are applied (in this case, N shows the final transition state, N: (C, M, Y)=(0, 0, 0) shows a state of white display W, N: (C, M, Y)=(1, 1, 1) shows a state of black display K, N: (C, M, Y)=(1, 0, 0) shows a state of cyan display C, N: (C, M, Y)=(0, 1, 1) shows a state of red display R, - - - , respectively) according to the final transition state N. Note here that V1, V2, V3, and VE (N) satisfy the relation of |V1|>|V2|>|V3|>|VE (N)|.

The first sub-frame group period S1 is a period where the state is transited from the base state of white (W) or black (K) to the first intermediate transition state (I1) where the relative color density of the charged particles Y becomes Ry. The second sub-frame group period S2 is a period where the state is transited from the first intermediate transition state (I1) to the second intermediate transition state (I2) where the Y density is Ry and the M density becomes Rm. The third sub-frame group period S3 is a period where the state is transited from the second intermediate transition state (I2) to the final transition state N. The final sub-frame period E is a period for preventing the final transition state N from being faded in color or being colored when the power of the display unit 50 is turned off and shifted to the retention period.

Figure 9:
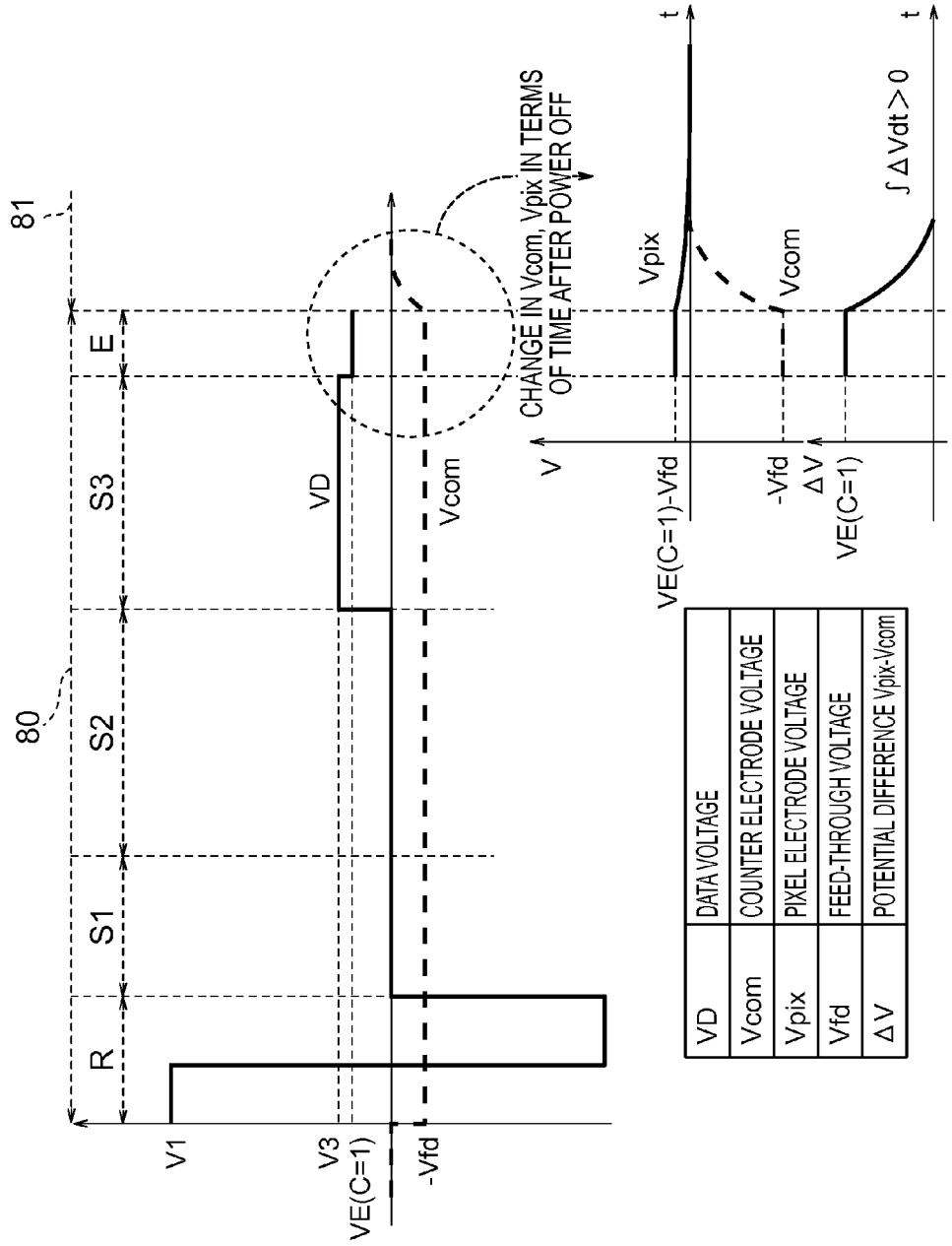
FIG. 9 is a graph showing a drive waveform in a case where the charged particles C are disposed on the counter electrode side at last according to a second embodiment.
Figure 10:
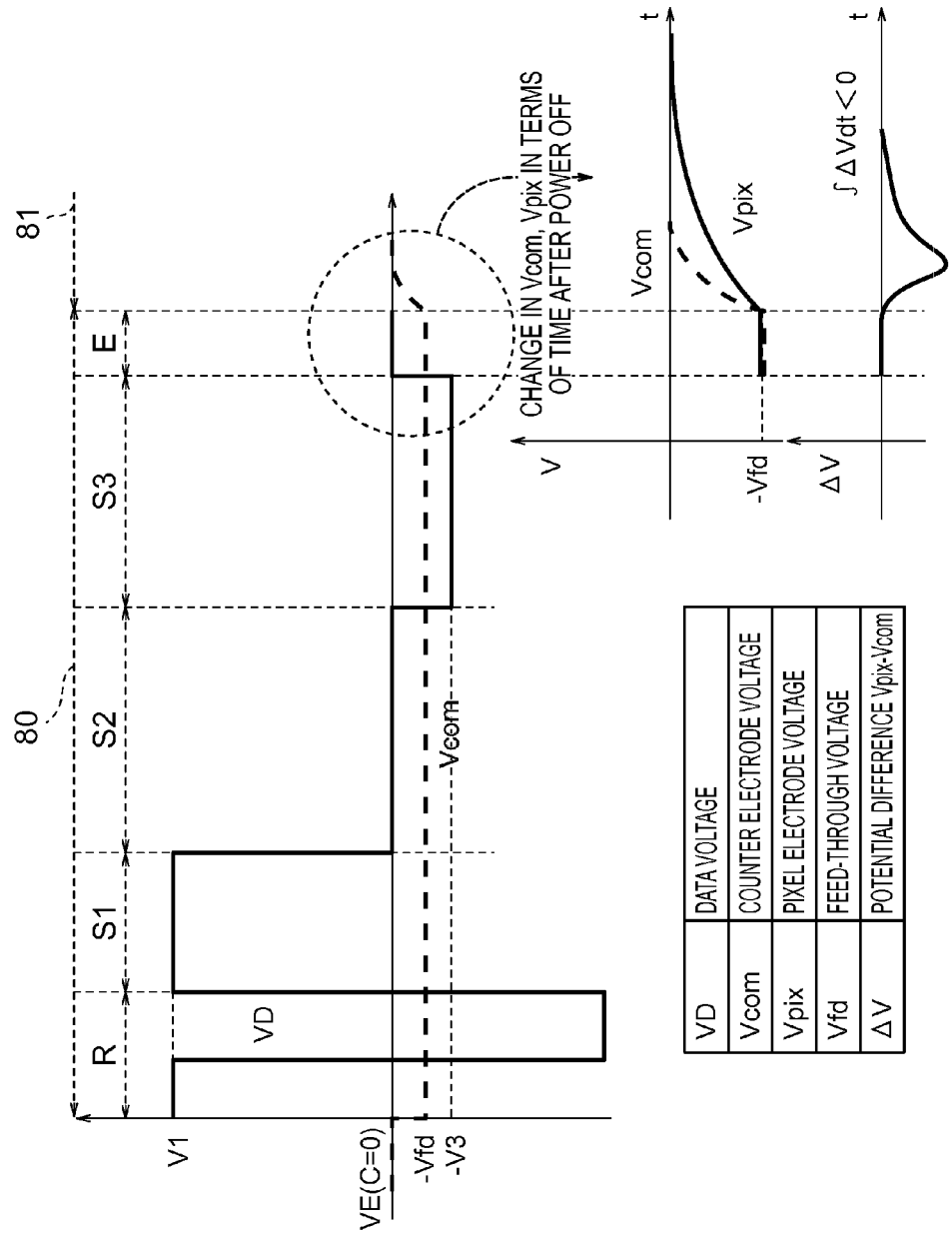
FIG. 10 is a graph showing a drive waveform in a case where the charged particles C are disposed on the pixel electrode side at last according to the second embodiment.

FIG. 9 and FIG. 10 show drive waveforms of the second embodiment. FIG. 9 is a drive waveform of a case of cyan display where the final transition state is N: (C, M, Y)=(1, 0, 0). FIG. 10 is a drive waveform of a case of red display as a complementary color of cyan where the final transition state is N: (C, M, Y)=(0, 1, 1). VD, Vcom, and V1 to V3 are the same reference codes as those of the first embodiment. VE (C=1) shows a voltage of the final sub-frame period where the charged particles C are on the counter side, and VE (C=0) shows a data voltage when the charged particles C are on the pixel electrode side. Further, VE (C=1)≠VE (C=0).

Figure 11A:
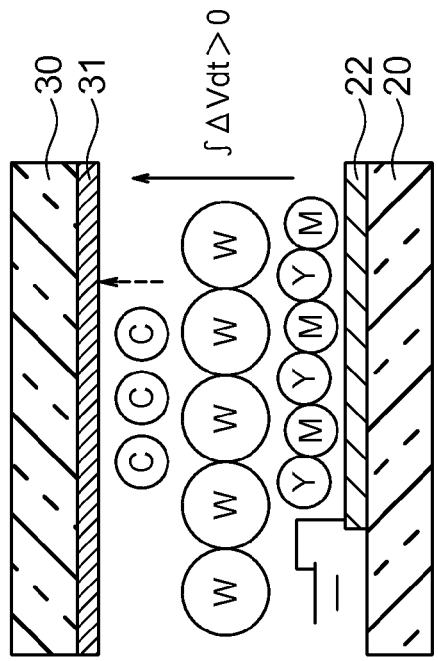
Figure 11B:
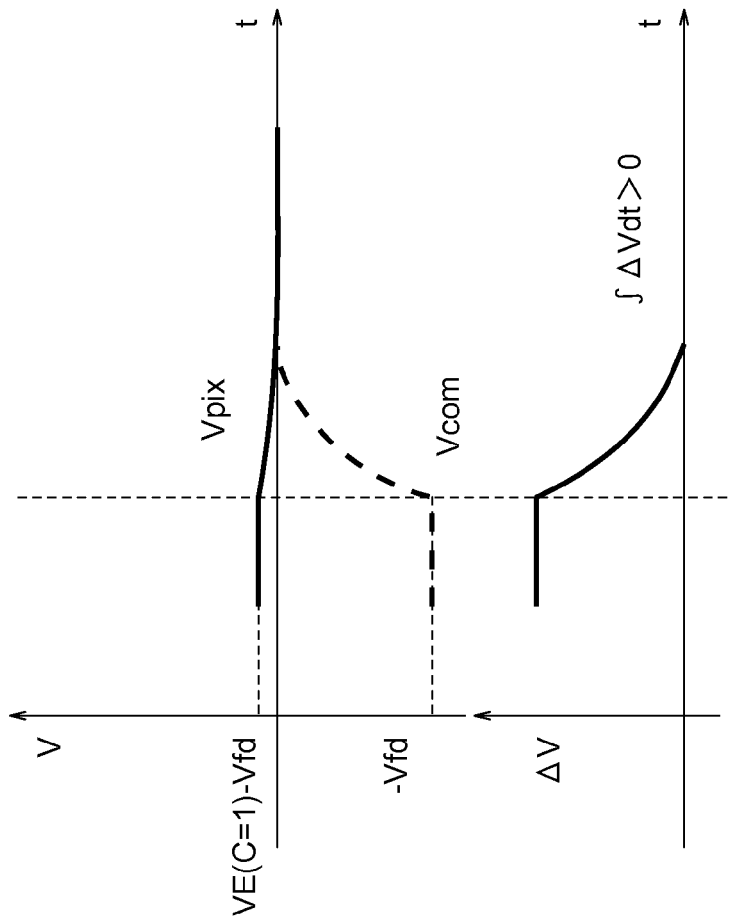
Figure 12A:
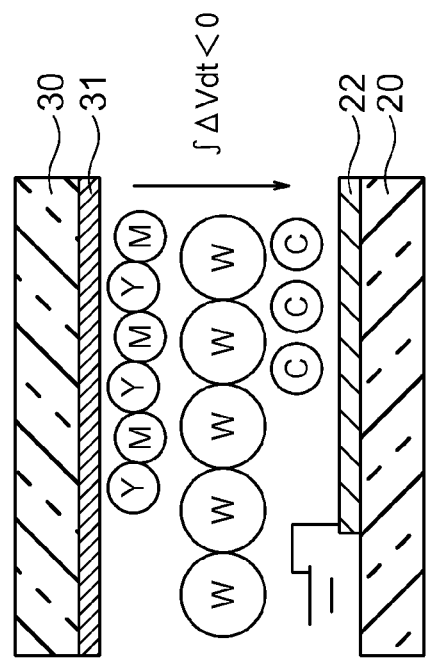
Figure 12B:
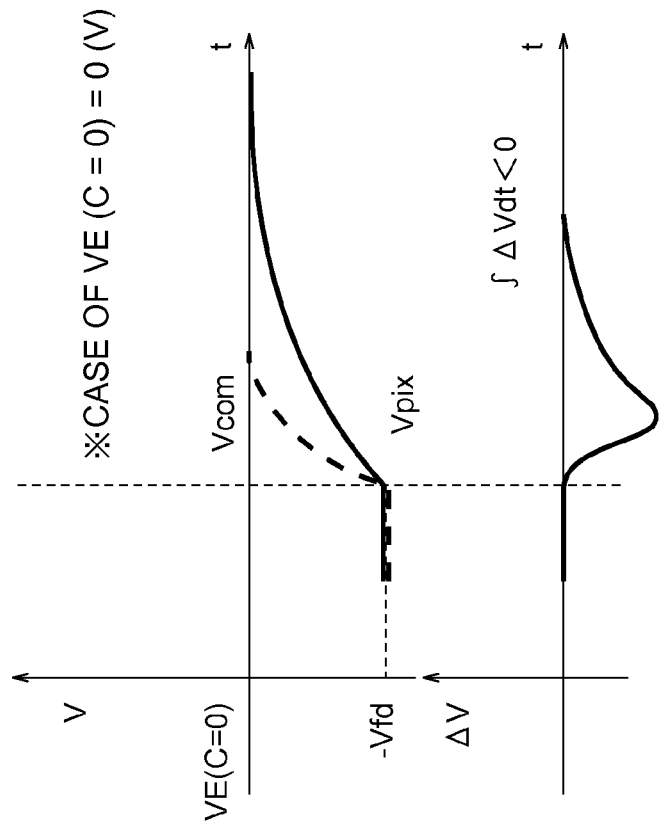

FIG. 11 shows charts showing the behavior of the charged particles C when the drive of FIG. 9 is done. FIG. 12 shows charts showing the behavior of the charged particles C when the drive of FIG. 10 is done. Hereinafter, explanations will be provided while assuming that the panel equivalent circuit time constant of the pixel electrode voltage Vpix when the power is turned off is larger than the panel equivalent circuit time constant of the counter electrode voltage Vcom. The case where the panel equivalent circuit time constant of the pixel electrode voltage Vpix when the power is turned off is larger than the panel equivalent circuit time constant of the counter electrode voltage Vcom can be generalized as a case where the time product of the potential difference between the pixel electrode 22 and the counter electrode 31 becomes ∫ΔVdt<0 when the final sub-frame period voltage is 0 (V).

FIG. 9 shows the waveform for displaying cyan that is the final transition state N: (C, M, Y)=(1, 0, 0) along with the expanded chart of the changes in terms of time in the counter electrode voltage Vcom and the pixel electrode voltage Vpix after the power is turned off. During the screen update period 80, the counter electrode voltage is adjusted to be minus with respect to the reference potential (GND) by the amount of the feed-through voltage Vfd, i.e., Vcom=−Vfd. In the final sub-frame period E, VD=VE (C) is written. VE (C) is adjusted to take a value larger than the VE of the first embodiment satisfying ∫ΔVdt=0 (hereinafter, written as VE (0)) and to set the time product of the potential difference between the pixel electrode 22 and the counter electrode 31 to satisfy ∫ΔVdt>0. That is, it is necessary to satisfy VE (C=1)>VE (0)=(a−1)/a×Vfd. The definition of a is the same as that of the first embodiment.

At this time, as shown in FIG. 11, a weak electric field is generated from the pixel electrode 22 towards the counter electrode 31 due to the fact that the time product of the potential difference between the pixel electrode 22 and the counter electrode 31 becomes ∫ΔVdt>0 Thereby, the charged particles C originally disposed on the counter electrode 31 side immediately after the screen update period 80 ends are further pushed towards the counter electrode 31 side. As a result, the adhesive force between the charged particles C and the electrode interface is enhanced, so that the retention capability is increased. Further, even when there is a change in the surrounding environment or there is an adjustment discrepancy in the counter electrode voltage Vcom, it is possible to have a wider setting margin compared to the case of ∫ΔVdt=0.

However, it is necessary to prevent the charged particles M and Y disposed on the pixel electrode 22 side from moving to the counter electrode 31 side when the power is turned off because the time product of the potential difference between the pixel electrode 22 and the counter electrode 31 becomes ∫ΔVdt (>0). Thus, it is preferable to set |VE (C=1)| to be equal to or smaller than the threshold voltage |Vth(m)| of the second largest charged particles M or to be equal to or less than the drive voltage |V3| of the maximum charged particles C.

As described above, VE (C=1) is preferable to be set as follows $$VE(C=1) > VE(0) = (a-1)/aVfd \text{ and}$$

$$|VE(C=1)| < |V3| \quad \text{(Expression 2.1)}$$

In the case of the second embodiment, V3=3(V), Vfd=2 (V), and a=2, so that it is set to a voltage satisfying 3>VE (C=1)>1, e.g., about VE (C=1)=2 (V).

FIG. 10 shows the waveform for displaying red as a complementary color of cyan, which is the final transition state N: (C, M, Y)=(0, 1, 1) along with the expanded chart of the changes in terms of time in the counter electrode voltage Vcom and the pixel electrode voltage Vpix after the power is turned off. In this case, the applied voltage of the final sub-frame period E is set as VE (C=0) that is different from VE (C=1) described above so that ∫ΔVdt<0 is satisfied. Here, it is set as VE (C=0)=0 (V).

In this case, ∫ΔVdt<0 is satisfied, so that a weak electric field is generated from the counter electrode 31 towards the pixel electrode 22 as shown in FIG. 12. The charged particles C originally disposed on the pixel electrode 22 side immediately after the screen update period 80 ends are further pushed towards the pixel electrode 22 side. As a result, the adhesive force between the charged particles C and the electrode interface is enhanced, so that the retention capability is increased. Further, even when there is a change in the surrounding environment or there is an adjustment discrepancy in the counter electrode voltage Vcom, it is possible to have a wider setting margin compared to the case of ∫ΔVdt=0.

However, it is necessary to prevent the charged particles M and Y disposed on the counter electrode 31 side from moving to the pixel electrode 22 side when the power is turned off due to the fact that the time product of the potential difference between the pixel electrode 22 and the counter electrode 31 becomes ∫ΔVdt (<0). Thus, it is preferable to set |VE (C=0)| to be equal to or smaller than the threshold voltage |Vth(m)| or to be equal to or less than the drive voltage |V3| of the maximum charged particles C.

As described above, VE (C=1) is preferable to be set as follows.

$$VE(C=0) < VE(0) = (a-1)/aVfd \text{ and}$$

$$|VE(C=0)| < |V3| \quad \text{(Expression 2.2)}$$

In the case of the second embodiment, $-V3=-3$(V), $Vfd=2$ (V), and $a=2$, so that it is possible to satisfy $\int\Delta Vdt<0$ by setting the voltage as about VE (C=0)=0 (V).

In a case where the time constant of the pixel electrode voltage Vpix is smaller than the time constant of the counter electrode voltage Vcom, the ratio a between the time constant of the counter electrode voltage Vcom and the time constant of the pixel electrode voltage Vpix takes a value satisfying $a<1$, e.g., $a=½$. Thus, provided that $V3=3$ (V), $Vfd=2$ (V), and $a=½$, VE (C=1) and VE (C=0) are required to satisfy following relations.

$$VE(C=1) > -2, \ |VE(C=0)| < 3$$

$$VE(C=0) < -2, \ |VE(C=1)| < 3$$

For example, it is possible to set as VE (C=1)=0 (V) and VE (C=0)=-2.5 (V).

It is needless to mention that the case where the panel circuit time constant of the pixel electrode voltage Vpix is smaller than the panel circuit time constant of the counter electrode voltage Vcom can be generalized as a case where the time product of the potential difference between the pixel electrode 22 and the counter electrode 31 satisfies $\int\Delta Vdt>0$ when the final sub-frame voltage is set as 0 (V).

The above can be summarized as follows. In a case where the update screen final transition state N: (C, M, Y)=(1, Rm, Ry) ($0 \leq Rm \leq 1$, $0 \leq Ry \leq 1$), i.e., when the charged particles C are disposed on the counter electrode 31 side, the data voltage VD of the final sub-frame period E is set as VE (C=1) which satisfies Expression (2.1). Further, in a case where the final transition state N: (C, M, Y)=(0, Rm, Ry) ($0 \leq Rm \leq 1$, $0 \leq Ry \leq 1$), i.e., when the charged particles C are disposed on the pixel electrode 22 side, the data voltage VD is set as VE (C=0) which satisfies Expression (2.2). In those cases, VE (C=1)$\neq$VE (C=0) according to the relations of Expression (2.1) and Expression (2.2).

It is also possible to set either VE (C=1) or VE (C=0) to 0 (V) (reference potential) according to the fact whether the time product of the potential difference between the pixel electrode 22 and the counter electrode 31 becomes $\int\Delta Vdt<0$ or $\int\Delta Vdt>0$ when the final sub-frame voltage is set as 0 (V).

Further, in a case where the density of the cyan component in the final transition state of the update screen is halftone, i.e., the final transition state N: (C, M, Y)=(Rc, Rm, Ry) ($0<Rc<1$, $0 \leq Rm \leq 1$, $0 \leq Ry \leq 1$), the data voltage VD applied in the final sub-frame period E is set as VE (C=1), VE (C=0), or the intermediate value thereof according to Rc that is the value of the possible cyan density.

For increasing the compensation effect of the voltage VE (0), it is possible to provide a period where the gate signal as well as the data signal is stopped and the discharge of the pixel electrode 22 is delayed by continuously applying the gate-off voltage to the gate driver 61 while starting the discharge of the counter electrode 31 between the end of the screen update period 80 and the point at which the display power is turned off.

The above is the explanation described about the case where the maximum charged particles are of the positive polarity. Regarding the case the where maximum charged particles are of the negative polarity, the range of the compensation voltage VE (N) to be satisfied needs to satisfy $\int\Delta Vdt<0$ when the negative maximum charged particles C are on the counter electrode 31 side. Thus, the relation becomes opposite from the case of the positive polarity as shown in the followings.

$$VE(C=1) < VE(0) = (a-1)/aVfd \text{ and}$$

$$|VE(C=1)| < |V3|$$

$$VE(C=0) > VE(0) = (a-1)/aVfd \text{ and}$$

$$|VE(C=0)| < |V3|$$

For example, the voltages are set as VE (C=1)=0 (V) and VE (C=0)=2 (V).

With the above-described structure, the margin of the set value of the counter electrode voltage Vcom is expanded and the influence of the surrounding environment is reduced. Thus, deterioration in the retention capability (memory) of the screen when the power is turned off can be suppressed further.

The case where the panel circuit time constant $\tau$pix of the pixel electrode voltage Vpix is larger than the panel circuit time constant $\tau$com of the counter electrode voltage Vcom is an example of a case where the time product of the potential difference between the pixel electrode 22 and the counter electrode 31 becomes $\int\Delta Vdt<0$ (V) when the voltage applied in the final sub-frame period E is 0 (V). Inversely, the case where the panel circuit time constant $\tau$pix is smaller than the panel circuit time constant $\tau$com is an example of a case where the time product becomes $\int\Delta Vdt>0$ (V) when the voltage applied in the final sub-frame period E is 0 (V). The reason for defining those as the examples is that the time product may become $\int\Delta Vdt>0$ (V) even when the panel circuit time constant $\tau$pix of the pixel electrode voltage Vpix is larger than the panel circuit time constant $\tau$com of the counter electrode voltage Vcom and the time product may become $\int\Delta Vdt<0$ (V) even when the panel circuit time constant $\tau$pix is smaller than the panel circuit time constant $\tau$com due to insufficient adjustment of the counter electrode voltage Vcom (the offset—Vfd of the feed-through amount is shifted). That is, the movement of the charged particles C depends on the time product $\int\Delta Vdt$, so that the time product $\int\Delta Vdt$ is the substantial parameter.

The final sub-frame period E may be defined as a final sub-frame group period constituted with a plurality of sub-frame group periods. It is needless to mention that the drive method of the update screen period 80 can be applied to all the drive waveforms that can achieve the color density of the final transition state N as long as the data applied voltage VE of the final sub-frame period E is satisfied. For example, a drive waveform which reaches the final transition state N after transited to the intermediate transition states (I1), (I2) from the previous transition state CUR without going through the base state WK and a drive waveform which reaches the final transition state N without going through the intermediate transitions states (I1), (I2) are also included in the present invention.

In the second embodiment, the electrophoretic particles 41 are constituted with nonpolar white particles W and the charged particles C, M, Y of the same polarity and different charged amounts. However, the relations regarding the charged amounts of each of the charged particles are not limited thereto. Further, it is needless to mention that a case where the charged particles C, M, Y are of different polarities and charged amounts, a case where the electrophoretic particles 41 are constituted with two particles, and a case where the electrophoretic particles 41 are constituted with more than three particles are also included in the present invention.

Further, the data voltage VD takes only three values that are the voltage +V, the voltage 0 (V), and the voltage −V in the reset period R and the first to third sub-frame groups S1 to S3 takes only two values VE (C=1) (or VE (C=0) and 0 (V) in the final sub-frame period E when either VE (C=0) or VE (C=1) is set as 0 (V). Therefore, it is possible to cut the cost through changing the voltage inputted to the driver for each sub-frame by using a simple 3-value driver which outputs three values of plus voltage/minus voltage/0 (V).

Further, instead of 0 (V) of the voltages +Vi, 0, −Vi (i=1, 2, 3) applied in the first to third sub-frame groups S1 to S3, it is also possible to apply a voltage that is smaller than the minimum threshold value Vth(C).

When the above-described structure is generalized, it can be expressed as follows.

The image display device 10 with a memory, which includes:
the TFT glass substrate 20 as the first substrate in which TFTs 21 as switching elements and the pixel electrodes 22 are arranged in matrix;
the counter substrate 30 as the second substrate where the counter electrode 31 is formed;
the electrophoretic layer 40 formed by containing the electrophoretic particles 41, which is interposed between the TFT glass substrate 20 and the counter substrate 30;
the display unit 50 which includes the TFT glass substrate 20, the counter substrate 30, and the electrophoretic layer 40; and
the voltage application unit 60 which, when updating the screen, applies a prescribed voltage to the electrophoretic particles 41 between the pixel electrode 22 and the counter electrode 31 in a prescribed period to update the display state of the display unit 50 to a next screen with a prescribed color density, wherein
the electrophoretic particles 41 are constituted with n kinds (n is an integer of 2 or larger) of charged particles C1, - - - , Cn which are mutually different in colors and threshold voltage for starting electrophoresis,
each of the charged particles C1, - - - , Cn exhibits a relation of "the threshold voltage |Vth(Cn)| of the charged particles Cn< - - - < the threshold voltage |Vth(C1)| of the charged particles C1", and
when a relative color density of the charged particle C1 of each of the pixels 23 which constitute the next screen to be updated is R1, - - - , and a relative color density of the charged particles Cn is Rn, the voltage VE (Rn) which depends on the relative color density Rn of the charged particles Cn is applied in the final sub-frame period E of the screen update period 80 that is the prescribed period where the voltage is applied.

Regarding the voltage VE (Rn), the voltage VE (Rn=1) when the relative color density of the charged particles Cn is 1 and the voltage VE (Rn=0) when the relative color density is 0 are different. Especially, a case where VE (Rn=1)=0 and VE (Rn=0)≠0 and a case where VE (Rn=1)≠0 and VE (Rn=0)=0 are included.

Further, it can also be generalized as follows.

Provided that the relative color density of the charged particles Cm in each of the pixels constituting the next screen to be updated is Rm,
the screen update period includes all the periods from the first period to the n-th period and the final period,
in the first period, the first voltage V1, −V1, or 0 is applied and the charged particles C is set to the relative color density R1,
in the m-th period, the m-th voltage Vm, −Vm, or 0 is applied and the charged particle Cm is set to the relative color density Rm while keeping the charged particles from C1 to C(m−1) as the relative color densities R1 to R(m−1), respectively, and
the threshold voltage and the voltage to be applied satisfy the relations of |Vth(Cm)|<|Vm|<|Vth(C(m−1))|, |Vth(C1)|<|V1|, and 0<|VE|<|Vn|.

With the second embodiment, in the image display device 10 that is the color electrophoretic display element using the charged particles C, M, and Y which are mutually different in colors and threshold voltage for starting electrophoresis, movement of the charged particles C having the largest charged amount (small threshold voltage) can be suppressed after the power is turned off through compensating the potential difference ΔV between the pixel electrode 22 and the counter electrode 31 generated at the time of turning off the power for display. Therefore, the retention capability (memory) of the screen can be improved.

Third Embodiment

In the first and second embodiments, the counter electrode voltage Vcom in the screen update period is set to be minus for the amount of the feed-through voltage, i.e., set to be Vcom=−Vfd and the counter electrode voltage Vcom in the retention period is set to change as Vcom→0 (V) when the power source voltage for display is turned off. In the meantime, in the third embodiment, the counter electrode voltage Vcom is set to the reference potential (GND, 0 (V)) regardless whether it is in the screen update period or in the retention period for simplifying the peripheral circuits of the display power source. In this case, the voltage applied in each sub-frame group and the final sub-frame in the first and second embodiments is required to be offset to plus for the amount of the feed-through.

As in the cases of the first and second embodiments, the image display device according to the third embodiment is an active matrix type color electrophoretic display device with nonpolar white particles W and the charged particles C, M, Y of the same polarity and different charged amounts. Further, the image display device according to the third embodiment has the same structure as those of the first and second embodiments except for a part of the functions of the voltage application unit. Therefore, detailed explanations thereof will be omitted.

The drive method according to the third embodiment employs a PWM drive in which a prescribed image is updated by continuously applying a specific voltage during a plurality of sub-frame periods as in the case of the drive method according to the first embodiment.

In the first embodiment, the drive period over a plurality of sub-frame is set as follows.

Counter electrode voltage in update screen period: −Vfd
Data voltage of reset period, first sub-frame group period: V1, 0, −V1
Data voltage of second sub-frame group period: V2, 0, −V2
Data voltage of third sub-frame group period: V3, 0, −V3
Data voltage of final sub-frame period: VE In the second embodiment, the drive period over a plurality of sub-frame is set as follows.

Counter electrode voltage in update screen period: −Vfd

Data voltage of reset period, first sub-frame group period: V1, 0, −V1

Data voltage of second sub-frame group period: V2, 0, −V2

Data voltage of third sub-frame group period: V3, 0, −V3

Data voltage of final sub-frame period: VE (C=1), VE (C=0)

Meanwhile, in the third embodiment, the drive period over a plurality of sub-frames is set as follows which corresponds to the first embodiment.

Counter electrode voltage in update screen period: 0

Data voltage of reset period, first sub-frame group period: V1+Vfd, +Vfd, −V1+Vfd Data voltage of second sub-frame group period: V2+Vfd, +Vfd, −V2+Vfd Data voltage of third sub-frame group period: V3+Vfd, +Vfd, −V3+Vfd Data voltage of final sub-frame period: VE (0)+Vfd Alternatively, in the third embodiment, the drive period over a plurality of sub-frame is set as follows which corresponds to the second embodiment.

Counter electrode voltage in update screen period: 0

Figure 13:
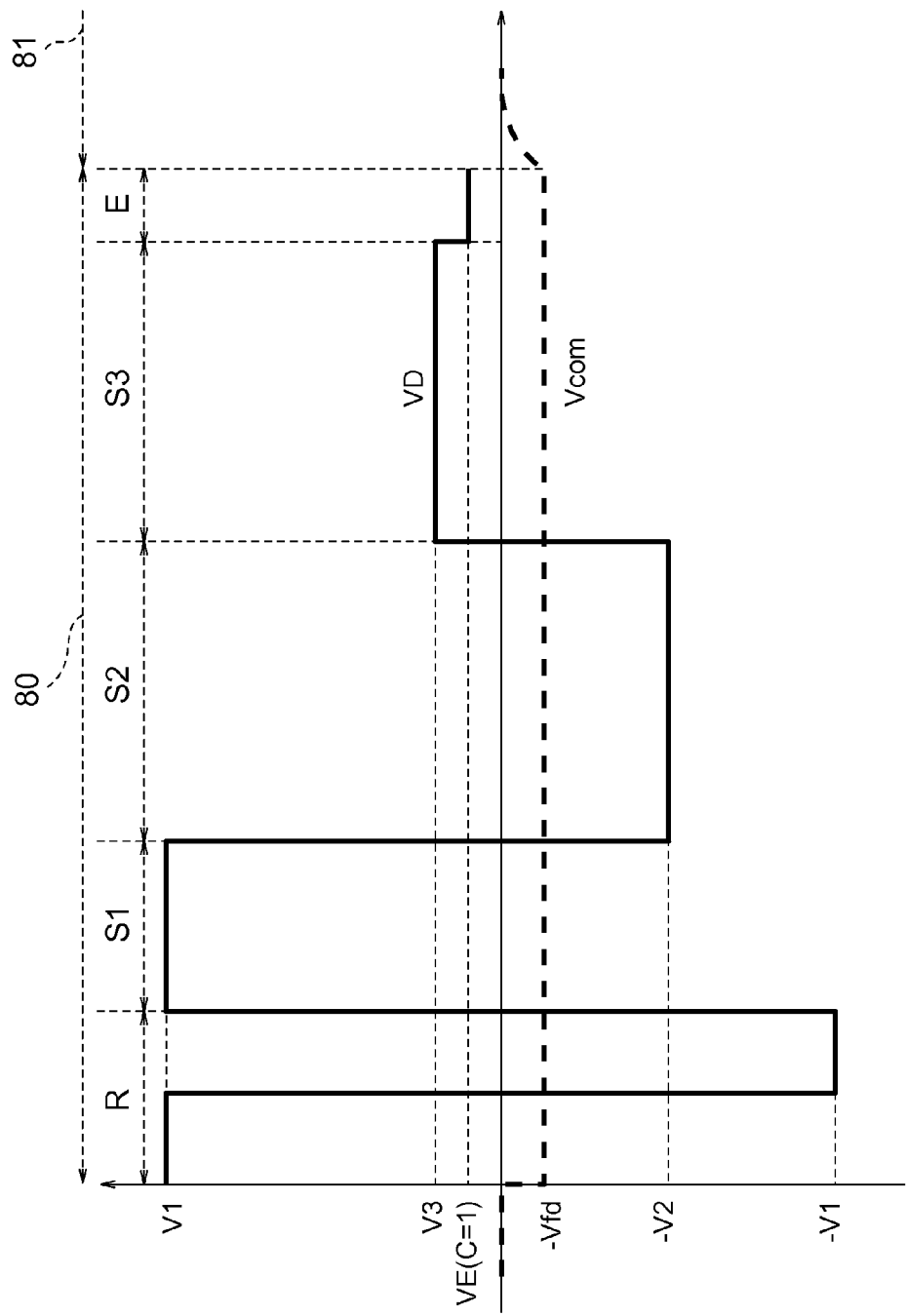
FIG. 13 is a graph showing a drive waveform for displaying green according to the second embodiment.
Figure 14:
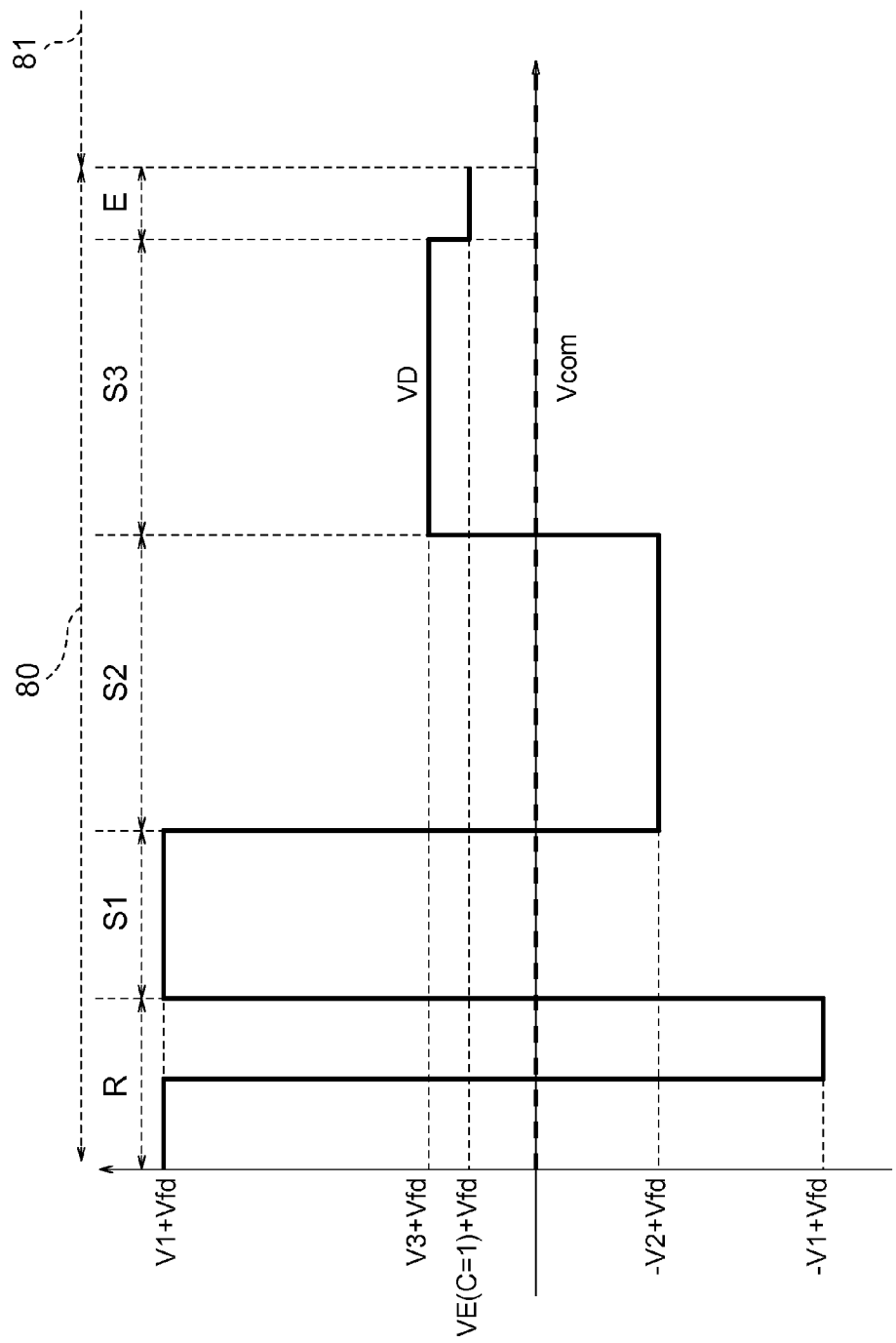
FIG. 14 is a graph showing a drive waveform for displaying green according to a third embodiment (corresponds to the second embodiment)

Data voltage of reset period, first sub-frame group period: V1+Vfd, +Vfd, −V1+Vfd Data voltage of second sub-frame group period: V2+Vfd, +Vfd, −V2+Vfd Data voltage of third sub-frame group period: V3+Vfd, +Vfd, −V3+Vfd Data voltage of final sub-frame period: VE (C=1)+Vfd, VE (C=0)+Vfd FIG. 13 shows the final transition state N: (1, 0, 1) of the second embodiment, i.e., a drive waveform for displaying green. FIG. 14 shows the final transition state N: (1, 0, 1) of the third embodiment, i.e., a drive waveform for displaying green. The third embodiment shown in FIG. 14 corresponds to the second embodiment. In the third embodiment, the applied voltage of each data voltage in the second embodiment is offset for the amount of the feed-through voltage Vfd to set the counter electrode voltage Vcom as 0 (V) that is the reference potential.

In addition to the effects of the first and second embodiments, the third embodiment makes it easy to design the power source circuit which generates the counter electrode voltage. Further, with the third embodiment, adjustment of the counter electrode voltage becomes unnecessary.

In the third embodiment, the electrophoretic elements are constituted with nonpolar white particles W and the charged particles C, M, Y of the same polarity and different charged amounts. However, the relations regarding the charged amounts of each of the charged particles are not limited thereto. Further, it is needless to mention that a case where the charged particles C, M, Y are of different polarities and changed amounts, a case where the electrophoretic particles are constituted with two particles, and a case where the electrophoretic particles are constituted with more than three particles are also included in the present invention.

Fourth Embodiment

In the third embodiment, the counter electrode voltage is set to 0 (V) that is the reference potential by offsetting the applied voltage of the data voltage to plus for the amount of the feed-through voltage Vfd. However, in this case, it is necessary to output +Vfd in the reset period and the first to third sub-frame group period. Thus, it is not possible to use a 3-value driver which can only output +V, 0, and −V.

In the meantime, the fourth embodiment provides a drive waveform that can be handled with a regular 3-value driver while fixing the counter electrode voltage to the reference potential. To do so and for adjusting the time product $-\int \Delta Vfddt$ of the feed-through voltage over the entire screen update period (the integral period is the entire screen update period), a DC cancel compensation sub-frame group period for applying the data voltage Vc satisfying the following is added.

$$Vc \times Tc = \int \Delta Vfddt \quad \text{(Expression 4.1)}$$

(Tc: time width of DC cancel period, Vc: data voltage of DC cancel period)

Thereby, the voltage applied in the reset period and the first to third sub-frame group period is not offset but only the voltage applied in the final sub-frame period is offset as VE→VE+Vfd. That is, the structure and the drive method of the fourth embodiment are as follows.

As in the cases of the first and second embodiments, the image display device according to the fourth embodiment is an active matrix type color electrophoretic display device with nonpolar white particles W and the electrophoretic particles C, M, Y of the same polarity and different charged amounts. Further, the image display device according to the fourth embodiment has the same structure as those of the first and second embodiments except for a part of the functions of the voltage application unit. Therefore, detailed explanations thereof will be omitted.

The drive method according to the fourth embodiment employs the PWM drive in which a prescribed image is updated by continuously applying a specific voltage during a plurality of sub-frame periods as in the case of the drive method according to the first embodiment.

In the fourth embodiment, the drive period over a plurality of sub-frames is set as follows by corresponding to the first embodiment.

Counter electrode voltage in update screen period: 0

DC cancel compensation period: Vc (voltage satisfying Expression 4.1)

Data voltage of reset period, first sub-frame group period: V1, 0, −V1

Data voltage of second sub-frame group period: V2, 0, −V2

Data voltage of third sub-frame group period: V3, 0, −V3

Data voltage of final sub-frame period: VE (0)+Vfd

Figure 15:
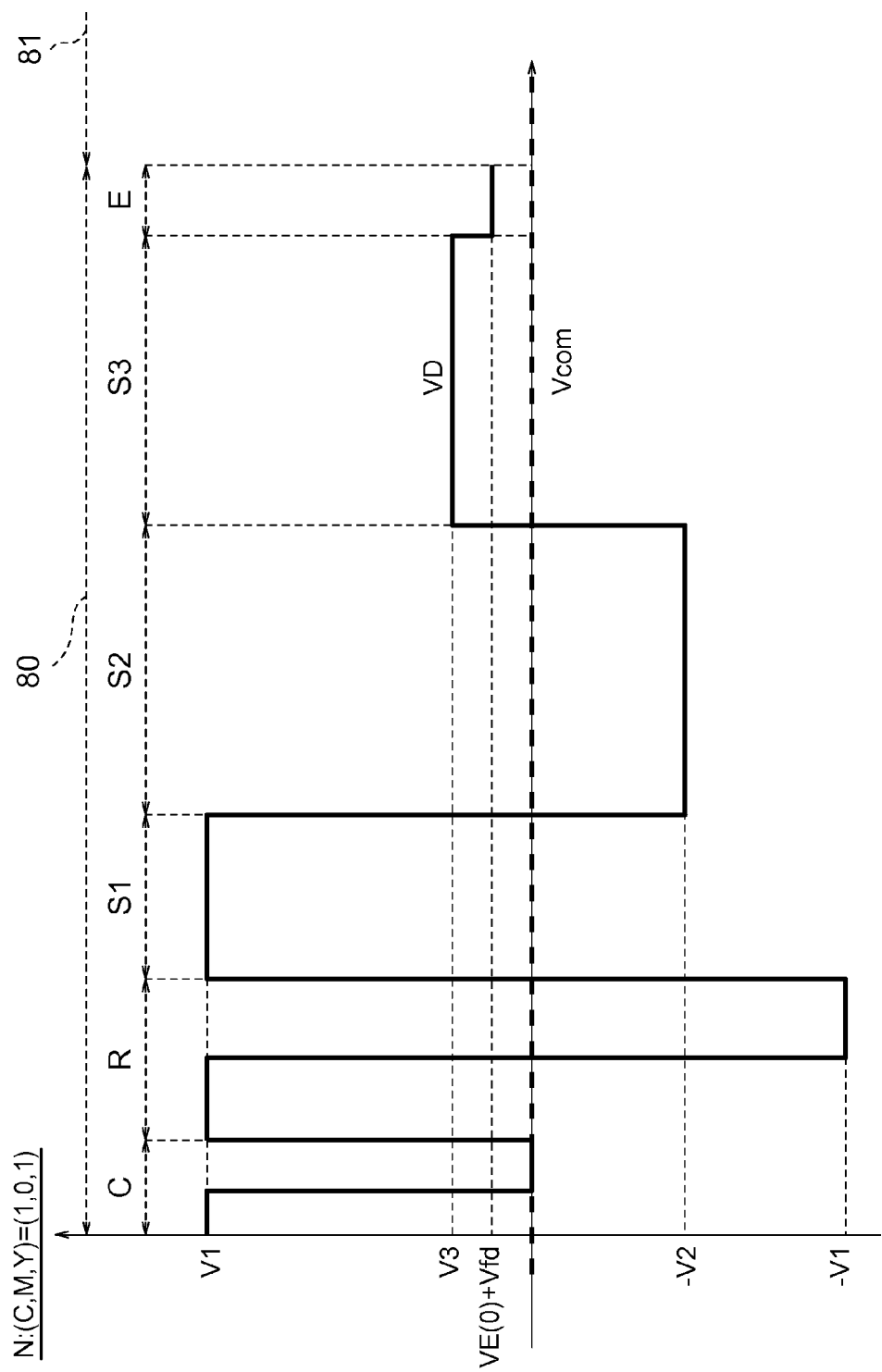
FIG. 15 is a graph showing a drive waveform for displaying green according to a fourth embodiment (corresponds to the first embodiment)

FIG. 15 shows a waveform for displaying green in the final transition state N: (1, 0, 1). Herein, the data voltage of the DC cancel group period is set as V1, and the time of the DC cancel period is set to satisfy Expression (4.1).

Further, in the fourth embodiment, the drive period over a plurality of sub-frames is set as follows by corresponding to the second embodiment.

1. A case where the time product of the potential difference between the pixel electrode and the counter electrode satisfies $\int \Delta Vdt<0$ when the voltage of the final sub-frame is set as 0 (V).

Counter electrode voltage in update screen period: 0

DC cancel compensation period: Vc (voltage satisfying Expression 4.1)

Data voltage of reset period, first sub-frame group period: V1, 0, −V1

Data voltage of second sub-frame group period: V2, 0, −V2

Data voltage of third sub-frame group period: V3, 0, −V3

Data voltage of final sub-frame period: VE (C=1)+Vfd (positive value), 0

2. A case where the time product of the potential difference between the pixel electrode and the counter electrode satisfies ∫ΔVdt>0 when the voltage of the final sub-frame is set as 0 (V).

Counter electrode voltage in update screen period: 0
DC cancel compensation period: Vc (voltage satisfying Expression 4.1)
Data voltage of reset period, first sub-frame group period: V1, 0, −V1
Data voltage of second sub-frame group period: V2, 0, −V2
Data voltage of third sub-frame group period: V3, 0, −V3
Data voltage of final sub-frame period: 0, VE (C=0)+Vfd (negative value)

Figure 16:
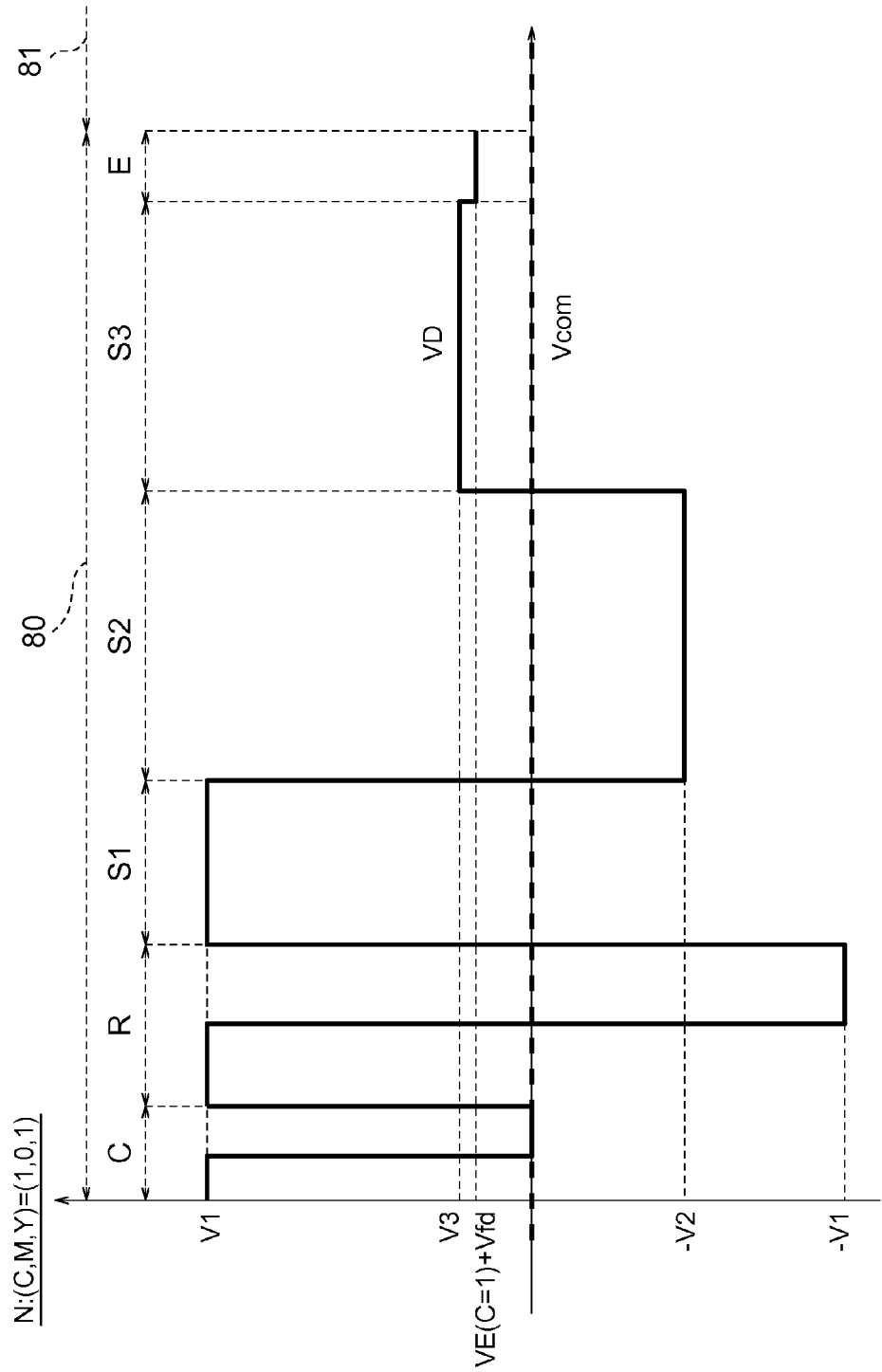
FIG. 16 is a graph showing a drive waveform for displaying green according to the fourth embodiment (corresponds to the second embodiment)
Figure 17:
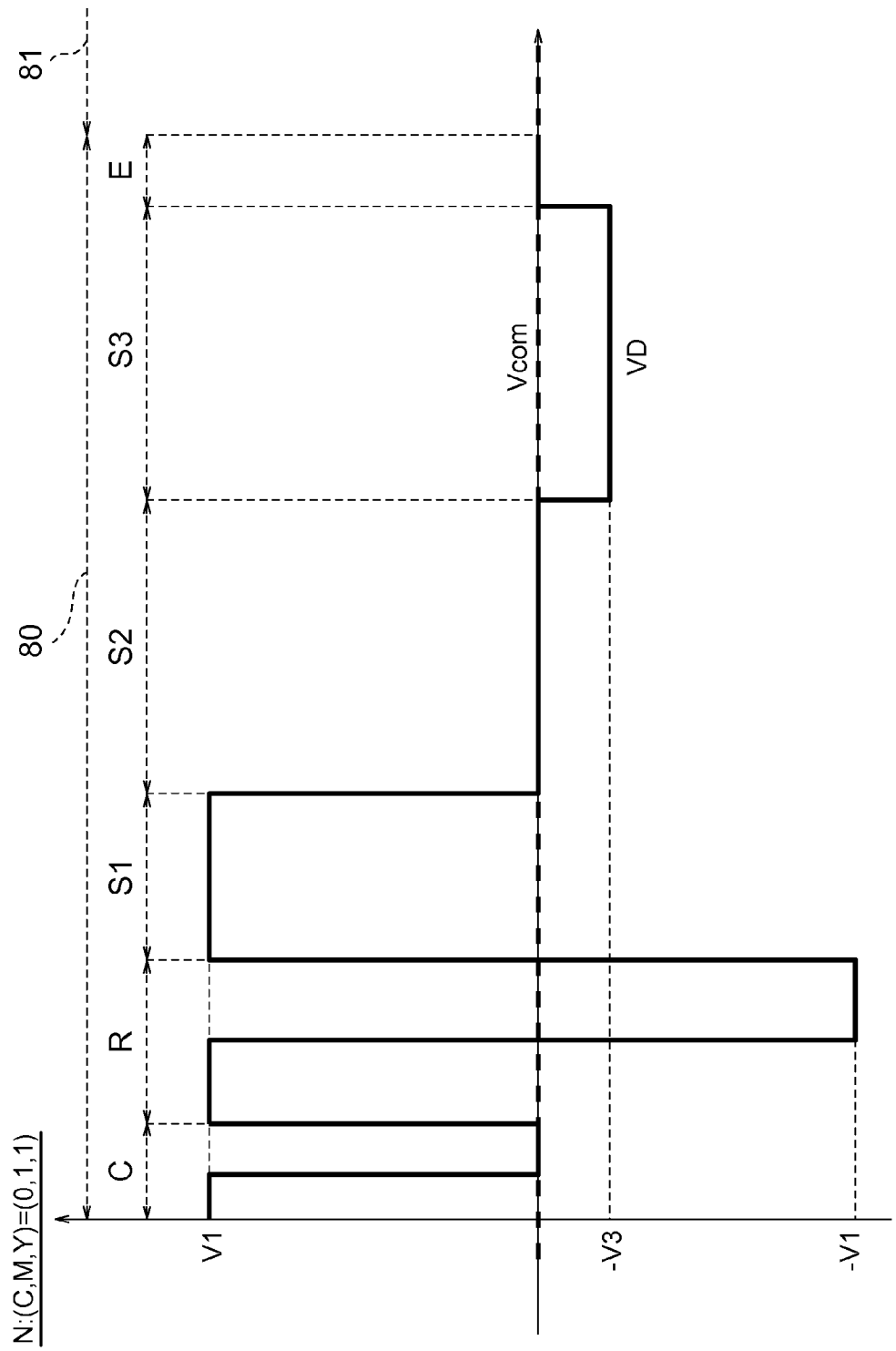
FIG. 17 is a graph showing a drive waveform for displaying red according to the fourth embodiment (corresponds to the second embodiment)
Figure 18:
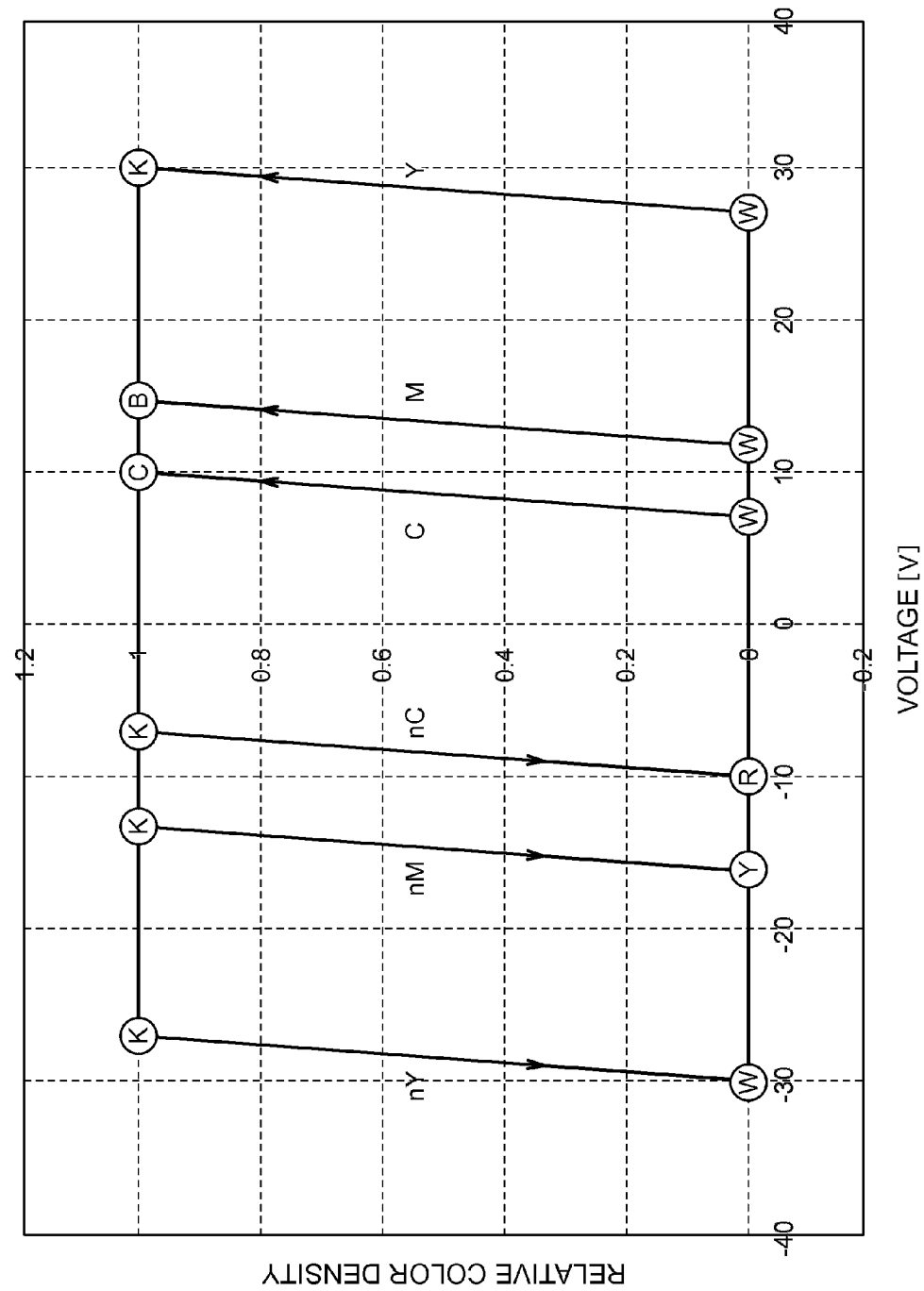
FIG. 18 is a graph showing the principle of color display of an image display device according to a related technique.

FIG. 16 shows a waveform for displaying green in the final transition state N: (1, 0, 1) in a case where ∫ΔVdt<0. FIG. 17 shows a waveform for displaying red in the final transition state N: (0, 1, 1) in a case where ∫ΔVdt<0. The voltage of the final sub-frame of the drive waveform of N: (1, 0, 1) is VE (C=1)+Vfd, and the voltage of the final sub-frame of the drive waveform of N: (0, 1, 1) is set as 0 (V). Further, the data voltage of the DC cancel group period is set as V1, and the time of the DC cancel period is set to satisfy Expression (4.1).

In addition to the effects of the first to third embodiments, the fourth embodiment makes it easy to design the power source circuit which generates the counter electrode voltage. Further, with the third embodiment, adjustment of the counter electrode voltage becomes unnecessary. At the same time, it becomes possible to deal with a regular 3-value driver, so that it is possible to cut the cost of the driver.

In the fourth embodiment, the electrophoretic elements are constituted with nonpolar white particles W and the charged particles C, M, Y of the same polarity and different charged amounts. However, the relations regarding the charged amounts of each of the charged particles are not limited thereto. Further, it is needless to mention that a case where the charged particles C, M, Y are of different polarities and changed amounts, a case where the electrophoretic particles are constituted with two particles, and a case where the electrophoretic particles are constituted with more than three particles are also included in the present invention.

While the present invention has been described above by referring to each of the embodiments shown in the drawings, the present invention is not limited only to each of the embodiments described above. Various changes and modifications occurred to those skilled in the art can be applied to the structures and the details of the present invention. Further, the present invention includes a part of or a whole part of the structures of each of the embodiments combined mutually as appropriate.

While a part of or a whole part of the embodiments can be summarized as follows as in following Supplementary Notes, the present invention is not necessarily limited only to the following structures.

(Supplementary Note 1)

An image display device with a memory, which includes:
a first substrate in which a plurality of pixels each having a switching element and a pixel electrode are arranged in matrix;
a second substrate on which a counter electrode is formed;
an electrophoretic layer formed by containing electrophoretic particles, which is interposed between the first substrate and the second substrate;
a display unit which includes the first substrate, the second substrate, and the electrophoretic layer; and
a voltage application unit which updates a display state of the display unit to a next screen in a prescribed color density by applying a voltage to the electrophoretic particles via the pixel electrode and the counter electrode in a screen update period, wherein
the electrophoretic particles contain n kinds (n is an integer of 2 or larger) of charged particles C1 to Cn which are mutually different in colors and threshold voltage for starting electrophoresis;
provided that m is an all the integers from 2 to n, threshold voltage |Vth(Cm)| of the charged particles Cm satisfies a relation of |Vth(Cm)|<|Vth(C(m−1))|; and
the voltage application unit applies a compensation voltage for suppressing movement of the charged particles Cn in a final period of the screen update period.

(Supplementary Note 2)

The image display device with the memory as depicted in Supplementary Note 1, wherein
the compensation voltage is a voltage VE that is different from a reference potential.

(Supplementary Note 3)

The image display device with the memory as depicted in Supplementary Note 2, wherein
provided that a definite integral regarding a potential difference between the pixel electrode and the counter electrode by time from a point at which apply of the voltage by the voltage application unit is ended until ∞ is defined as ∫ΔVdt=∫(Vpix−Vcom)dt, and an absolute value of the definite integral when a voltage 0 is applied in the final period and an absolute value of a definite integral when the voltage VE is applied in the final period are |∫ΔVdt (0)| and |∫ΔVdt (VE≠0)|, respectively, the voltage VE satisfies a relation of |∫ΔVdt (0)|>|∫ΔVdt (VE≠0)|.

(Supplementary Note 4)

The image display device as depicted in Supplementary Note 2 or 3, wherein
provided that a relative color density of the charged particles Cm in each of the pixels constituting a next screen to be updated is Rm,
the screen update period includes all the periods from the first period to the n-th period and the final period,
in the first period, a first voltage V1, −V1, or 0 is applied and the charged particles C1 are set to a relative color density R1,
in an m-th period, a m-th voltage Vm, −Vm, or 0 is applied and the charged particles Cm are set to a relative color density Rm while keeping the charged particles from C1 to C(m−1) as the relative color densities R1 to R(m−1), respectively, and
the threshold voltage and the voltage to be applied satisfy the relations of |Vth(Cm)|<|Vm|<|Vth(C(m−1))|, |Vth(C1)|<|V1|, and 0<|VE|<|Vn|.

(Supplementary Note 5)

The image display device with the memory as depicted in Supplementary Note 1, wherein
provided that a relative color density of the charged particles Cn in each of the pixels constituting a next screen to be updated is Rn, the compensation voltage is a voltage VE (Rn) which depends on the relative color density Rn.

(Supplementary Note 6)

The image display device with the memory as depicted in Supplementary Note 5, wherein the voltage VE (Rn) varies for the voltage VE (Rn=1) when the relative color density Rn is 1 and for the voltage VE (Rn=0) when the relative color density Rn is 0.

(Supplementary Note 7)

The image display device with the memory as depicted in Supplementary Note 6, wherein
regarding the voltage VE (Rn=1) and the voltage VE (Rn=0), VE (Rn=0)≠0 when VE (Rn=1)=0.

(Supplementary Note 8)

The image display device with the memory as depicted in Supplementary Note 6, wherein
regarding the voltage VE (Rn=1) and the voltage VE (Rn=0), VE (Rn=0)=0 when VE (Rn=1)≠0.

(Supplementary Note 9)

The image display device with the memory as depicted in any one of Supplementary Notes 5 to 8, wherein
provided that the relative color density of the charged particles Cm in each of the pixels constituting the next screen to be updated is Rm,
the screen update period includes all the periods from the first period to the n-th period and the final period,
in the first period, the first voltage V1, −V1, or 0 is applied and the charged particles C1 are set to the relative color density R1,
in the m-th period, the m-th voltage Vm, −Vm, or 0 is applied and the charged particles Cm are set to the relative color density Rm while keeping the charged particles from C1 to C(m−1) as the relative color densities R1 to R(m−1), respectively, and
the threshold voltage and the voltage to be applied satisfy the relations of |Vth(Cm)|<|Vm|<|Vth(C(m−1))|, |Vth(C1)|<|V1|, and 0|VE(Rn)|<|Vn|.

(Supplementary Note 10)

The image display device with the memory as depicted in Supplementary Note 2 or 5, wherein
the voltage applied to the counter electrode is 0 (V) that is a reference potential.

(Supplementary Note 11)

The image display device with the memory as depicted in Supplementary Note 10, wherein
the screen update period further includes a DC cancel compensation period for applying a DC cancel voltage Vc in order to compensate a feed-through voltage over the entire screen update period.

(Supplementary Note 21)

An image display device with a memory, which includes:
a first substrate in which switching elements and pixel electrodes are arranged in matrix;
a second substrate where a counter electrode is formed;
an electrophoretic layer formed by containing electrophoretic particles, which is interposed between the first substrate and the second substrate;
a display unit which includes the first substrate, the second substrate, and the electrophoretic layer; and
a voltage application unit which, when updating the screen, applies a prescribed voltage to the electrophoretic particles between the pixel electrode and the counter electrode in a prescribed period to update the display state of the display unit to a next screen with a prescribed color density, wherein
the electrophoretic particles are constituted with n kinds (n is an integer of 2 or larger) of charged particles C1, - - - , Cn which are mutually different in colors and threshold voltage for starting electrophoresis,
each of the charged particles C1, - - - , Cn exhibits a relation of "the threshold voltage |Vth(Cn)| of the charged particles Cn< - - - < the threshold voltage |Vth(C1)| of the charged particles C1", and
when a relative color density of the charged particle C1 of each of the pixels which constitute the next screen to be updated is R1, - - - , and a relative color density of the charged particles Cn is Rn, the voltage VE that is different from the reference potential is applied in the final sub-frame period of the screen update period that is the prescribed period where the voltage is applied.

(Supplementary Note 22)

The image display device with the memory as depicted in Supplementary Note 21, wherein
provided that the time product of the potential difference between the pixel electrode and the counter electrode is $\int \Delta Vdt = \int (Vpix - Vcom)dt$ ($\int$ is time product from the power-off to $\infty$), the absolute value of the time product when the applied voltage 0 (V) of the final sub-frame is supplied is $|\int \Delta Vdt|(0)$, and the absolute value of the time product when the applied voltage VE of the final sub-frame is supplied is $|\int \Delta Vdt (VE \neq 0)|$, the relation of $|\int \Delta Vdt (0)| > |\int \Delta Vdt (VE \neq 0)|$ is satisfied.

(Supplementary Note 23)

The image display device with memory as depicted in Supplementary Note 21 or 22, wherein:
the screen update period includes a first sub-frame group in which a first voltage V1 (or −V1) or/and 0 (V) is applied and the relative color density of the charged particles C1, - - - , Cn becomes R1, - - - ,
an n-th sub-frame group in which an n-th voltage Vn (or −Vn) or/and 0 (V) is applied and the relative color density of the charged particles Cn becomes Rn while keeping the relative color densities of the charged particles C1, - - - , Cn−1 as R1, - - - , Rn−1, and
the final sub-frame; and
the threshold voltage of each of the charged particles and the voltage in each of the voltage applying periods satisfy relations of |Vth(cn)|<|Vn|<|Vth(cn−1)|, - - - , |Vth(c1)|<|V1| and 0<|VE|<|Vn|.

(Supplementary Note 24)

An image display device with a memory, which includes:
a first substrate in which switching elements and pixel electrodes are arranged in matrix;
a second substrate where a counter electrode is formed;
an electrophoretic layer formed by containing electrophoretic particles, which is interposed between the first substrate and the second substrate;
a display unit which includes the first substrate, the second substrate, and the electrophoretic layer; and
a voltage application unit which, when updating the screen, applies a prescribed voltage to the electrophoretic particles between the pixel electrode and the counter electrode in a prescribed period to update the display state of the display unit to a next screen with a prescribed color density, wherein
the electrophoretic particles are constituted with n kinds (n is an integer of 2 or larger) of charged particles C1, - - - , Cn which are mutually different in colors and threshold voltage for starting electrophoresis,
each of the charged particles C1, - - - , Cn exhibits a relation of "the threshold voltage |Vth(Cn)| of the charged particles Cn< - - - < the threshold voltage |Vth(C1)| of the charged particles C1", and
when a relative color density of the charged particle C1 of each of the pixels which constitute the next screen to be updated is R1, - - - , and a relative color density of the charged particles Cn is Rn, the voltage VE (Rn) which depends on the relative color density Rn of the charged particles Cn is applied in the final sub-frame period of the screen update period that is the prescribed period where the voltage is applied.

(Supplementary Note 25)

The image display device with the memory as depicted in Supplementary Note 24, wherein the voltage VE (Rn) varies for the voltage VE (Rn=1) when the relative color density of the charged particles Cn is 1 and for the voltage VE (Rn=0) when the relative color density of the charged particles Cn is 0.

(Supplementary Note 26)

The image display device with the memory as depicted in Supplementary Note 25, wherein $$VE(Rn=0) \neq 0 \text{ when } VE(Rn=1)=0.$$

(Supplementary Note 27)

The image display device with the memory as depicted in Supplementary Note 25, wherein $$VE(Rn=0)=0 \text{ when } VE(Rn=1) \neq 0.$$

(Supplementary Note 28)

The image display device with memory as depicted in Supplementary Note 24, wherein:

the screen update period includes a first sub-frame group in which a first voltage V1 (or −V1) or/and 0 (V) is applied and the relative color density of the charged particles C1, - - -, Cn becomes R1,

- - -, an n-th sub-frame group in which an n-th voltage Vn (or −Vn) or/and 0 (V) is applied and the relative color density of the charged particles Cn becomes Rn while keeping the relative color densities of the charged particles C1, - - -, Cn−1 as R1, - - -, Rn−1, and the final sub-frame; and the threshold voltage of each of the charged particles and the voltage in each of the voltage applying periods satisfy relations of |Vth(cn)|<|Vn|<|Vth(cn−1)|, - - -, |Vth(c1)|<|V1| and 0≤|VE(Rn)|<|Vn|.

(Supplementary Note 29)

The image display device with the memory as depicted in Supplementary Note 21 or 24, wherein the voltage applied to the counter electrode is 0 (V) that is a reference potential.

(Supplementary Note 30)

The image display device with the memory as depicted in Supplementary Note 29, wherein the screen update period further includes a DC cancel compensation sub-frame group for applying a DC cancel voltage Vc in order to compensate a feed-through voltage over the entire screen update period.

INDUSTRIAL APPLICABILITY

The present invention can be utilized for an image display devices with a memory, which retains images even when the power is turned off.

REFERENCE NUMERALS

10 Image display device
20 TFT glass substrate (first substrate)
21 TFT (switching element)
21a Semiconductor layer
21g Gate electrode
21s Source electrode
21d Drain electrode
22 Pixel electrode
23 Pixel
24, 25 Insulating film
30 Counter substrate (second substrate)
31 Counter electrode
40 Electrophoretic layer
41 Electrophoretic particle
42 Solvent
43 Sealing member
50 Display unit
60 Voltage application unit
61 Gate driver
62 Data driver
63, 64, 65, 66 FPC connector
70 Electronic paper module substrate
71 Electronic paper controller
72 Graphic memory
73 CPU
74 Main memory
75 Storage device
76 Data transmission/reception unit
80 Screen update period
81 Retention period
C, M, Y Charged particles
W White particle

The invention claimed is:

1. An image display device with a memory, comprising:
a display unit which includes a first substrate, a second substrate, and an electrophoretic layer;
the first substrate in which a plurality of pixels each having a switching element and a pixel electrode are arranged in matrix;
the second substrate on which a counter electrode is formed;
the electrophoretic layer formed by containing electrophoretic particles, which is interposed between the first substrate and the second substrate;
and
a voltage application unit which updates a display state of the display unit to a next screen in a prescribed color density by applying a voltage to the electrophoretic particles via the pixel electrode and the counter electrode in a screen update period, wherein
the electrophoretic particles contain n kinds (n is an integer of 2 or larger) of charged particles C1 to Cn which are mutually different in colors and threshold voltage for starting electrophoresis;
provided that for each m, a threshold voltage |Vth(Cm)| of the charged particles Cm satisfies a relation of |Vth(Cm)|<|Vth(C(m−1))|, where m are all the integers from 2 to n; and
the voltage application unit applies a compensation voltage for suppressing movement of the charged particles Cn in a final period of the screen update period,
wherein the compensation voltage is a voltage VE that is different from a reference potential,
provided that an integral regarding a potential difference between the pixel electrode and the counter electrode with respect to time from a point at which apply of the voltage by the voltage application unit is ended until ∞ is defined as ∫ΔVdt=∫(Vpix−Vcom)dt, and an absolute value of the integral when a 0 voltage is applied in the final period and an absolute value of the integral when the voltage VE is applied in the final period are |∫ΔVdt (0)| and |∫ΔVdt (VE≠0)|, respectively, the voltage application unit applies the voltage VE satisfies a relation of |∫ΔVdt (0)|>|∫ΔVdt (VE≠0)|, and provided that a panel equivalent circuit time constant of the pixel electrode is τ, a panel equivalent circuit time constant of the counter electrode is a τ, and a feed-through voltage is Vfd, the voltage VE satisfies a relation of VE=(a−1)/a×Vfd.

2. The image display device as claimed in claim 1, wherein
provided that a relative color density of the charged particles Cm in each of the pixels constituting a next screen to be updated is Rm,
the screen update period includes all the periods from the first period to the n-th period and the final period,
in the first period, a first voltage V1, −V1, or 0 is applied and the charged particles C1 are set to a relative color density R1,
in an m-th period, a m-th voltage Vm, −Vm, or 0 is applied and the charged particles Cm are set to a relative color density Rm while keeping the charged particles from C1 to C(m−1) as the relative color densities R1 to R(m−1), respectively, and
the threshold voltage and the voltage to be applied satisfy the relations of |Vth(Cm)|<|Vm|<|Vth(C(m−1))|, |Vth(C1)|<|V1|, and 0<|VE|<|Vn|.

3. The image display device with the memory as claimed in claim 1, wherein provided that a relative color density of the charged particles Cn in each of the pixels constituting a next screen to be updated is Rn, the compensation voltage is a voltage VE (Rn) which depends on the relative color density Rn.

4. The image display device with the memory as claimed in claim 3, wherein the voltage VE (Rn) varies for the voltage VE (Rn=1) when the relative color density Rn is 1 and for the voltage VE (Rn=0) when the relative color density Rn is 0.

5. The image display device with the memory as claimed in claim 4, wherein regarding the voltage VE (Rn=1) and the voltage VE (Rn=0), VE (Rn=0)≠0 when VE (Rn=1)=0.

6. The image display device with the memory as claimed in claim 4, wherein regarding the voltage VE (Rn=1) and the voltage VE (Rn=0), VE (Rn=0)=0 when VE (Rn=1)≠0.

7. The image display device with the memory as claimed in claim 3, wherein
provided that the relative color density of the charged particles Cm in each of the pixels constituting the next screen to be updated is Rm,
the screen update period includes all the periods from the first period to the n-th period and the final period,
in the first period, a first voltage V1, −V1, or 0 is applied and the charged particles C1 are set to a relative color density R1,
in the m-th period, an m-th voltage Vm, −Vm, or 0 is applied and the charged particles Cm are set to a relative color density Rm while keeping the charged particles from C1 to C(m−1) as the relative color densities R1 to R(m−1), respectively, and
the threshold voltage and the voltage to be applied satisfy the relations of |Vth(Cm)|<|Vm|<|Vth(C(m−1))|, |Vth(C1)|<|V1|, and 0<|VE|<|Vn|.

8. The image display device with the memory as claimed in claim 3, wherein the voltage applied to the counter electrode is 0 (V) that is a reference potential.

9. The image display device with the memory as claimed in claim 1, wherein the voltage applied to the counter electrode is 0 (V) that is a reference potential.

10. The image display device with the memory as claimed in claim 9, wherein the screen update period further includes a DC cancel compensation period for applying a DC cancel voltage Vc in order to compensate a feed-through voltage over the entire screen update period.

11. An image display device with a memory, comprising:
a display unit which includes a first substrate, a second substrate, and an electrophoretic layer;
the first substrate in which a plurality of pixels each having a switching element and a pixel electrode are arranged in matrix;
the second substrate on which a counter electrode is formed;
the electrophoretic layer formed by containing electrophoretic particles, which is interposed between the first substrate and the second substrate;
and
voltage application means for updating a display state of the display unit to a next screen in a prescribed color density by applying a voltage to the electrophoretic particles via the pixel electrode and the counter electrode in a screen update period, wherein
the electrophoretic particles contain n kinds (n is an integer of 2 or larger) of charged particles C1 to Cn which are mutually different in colors and threshold voltage for starting electrophoresis;
provided that for each m, a threshold voltage |Vth(Cm)| of the charged particles Cm satisfies a relation of |Vth(Cm)|<|Vth(C(m−1))|, where m are all the integers from 2 to n; and
the voltage application means applies a compensation voltage for suppressing movement of the charged particles Cn in a final period of the screen update period, wherein the compensation voltage is a voltage VE that is different from a reference potential,
provided that an integral regarding a potential difference between the pixel electrode and the counter electrode with respect to time from a point at which apply of the voltage by the voltage application means is ended until ∞ is defined as ∫ΔVdt=∫(Vpix−Vcom)dt, and an absolute value of the integral when a 0 voltage is applied in the final period and an absolute value of the integral when the voltage VE is applied in the final period are |∫ΔVdt (0)| and |∫ΔVdt (VE≠0)|, respectively, the voltage application means applies the voltage VE satisfies a relation of |∫ΔVdt (0)|>|∫ΔVdt (VE≠0)|, and
provided that a panel equivalent circuit time constant of the pixel electrode is τ, a panel equivalent circuit time constant of the counter electrode is a τ, and a feed-through voltage is Vfd, the voltage VE satisfies a relation of VE=(a−1)/a×Vfd.

12. The image display device with the memory as claimed in claim 8, wherein the screen update period further includes a DC cancel compensation period for applying a DC cancel voltage Vc in order to compensate a feed-through voltage over the entire screen update period.

* * * * *